US007685079B2

(12) United States Patent
Watford et al.

(10) Patent No.: US 7,685,079 B2
(45) Date of Patent: Mar. 23, 2010

(54) METHODS FOR EVALUATING ROBUSTNESS OF SOLUTIONS TO CONSTRAINT PROBLEMS

(75) Inventors: Glen Alan Watford, Wilmington, NC (US); David Joseph Kropaczek, Wilmington, NC (US); William Earl Russell, II, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 713 days.

(21) Appl. No.: 11/642,824

(22) Filed: Dec. 21, 2006

(65) Prior Publication Data

US 2008/0154838 A1 Jun. 26, 2008

(51) Int. Cl.
*G06E 1/00* (2006.01)
*G06E 3/00* (2006.01)
*G06F 15/18* (2006.01)
*G06G 7/00* (2006.01)

(52) U.S. Cl. ...................................................... 706/19
(58) Field of Classification Search ..................... 706/19
See application file for complete search history.

(56) References Cited

U.S. PATENT DOCUMENTS

| | | | |
|---|---|---|---|
| 5,272,736 A | 12/1993 | Wolters, Jr. et al. | |
| 5,677,938 A | 10/1997 | Gassmann | |
| 5,790,618 A | 8/1998 | Fawks, Jr. | |
| 5,912,933 A | 6/1999 | Shaug et al. | |
| 6,748,348 B1 | 6/2004 | Russell, II | |
| 7,072,723 B2 * | 7/2006 | Kohn et al. | 700/28 |
| 7,089,220 B2 * | 8/2006 | Fromherz et al. | 706/45 |
| 7,089,221 B2 * | 8/2006 | Fromherz et al. | 706/46 |
| 7,200,541 B2 * | 4/2007 | Kropaczek et al. | 703/13 |
| 7,216,004 B2 * | 5/2007 | Kohn et al. | 700/28 |
| 7,222,061 B2 * | 5/2007 | Russell et al. | 703/18 |
| 7,333,968 B2 * | 2/2008 | Geller et al. | 706/46 |
| 7,424,412 B2 * | 9/2008 | Kropaczek et al. | 703/6 |
| 7,437,276 B2 * | 10/2008 | Kropaczek et al. | 703/2 |
| 7,461,038 B2 * | 12/2008 | Kropaczek et al. | 706/19 |

(Continued)

OTHER PUBLICATIONS

An Interactive Fuzzy Decisionmaking Method Using Constraint Problems Sakawa, M.; Yano, H.; Systems, Man and Cybernetics, IEEE Transactions on vol. 16, Issue 1, Jan. 1986 pp. 179-182 Digital Object Identifier 10.1109/TSMC.1986.289298.*

(Continued)

*Primary Examiner*—Michael B Holmes
(74) *Attorney, Agent, or Firm*—Harness, Dickey & Pierce, P.L.C.

(57) ABSTRACT

Methods for evaluating robustness of solutions to constraint problems include: (a) determining one or more inputs for the constraint problem; (b) determining bias, uncertainty, or bias and uncertainty of the one or more inputs; (c) randomly perturbating at least one of the one or more inputs based on the bias, uncertainty, or bias and uncertainty of the one or more inputs to determine one or more modified inputs; (d) generating a solution to the constraint problem based on the one or more modified inputs; (e) storing the solution; (f) repeating (c) through (e) until multiple solutions are stored; and/or (g) determining the robustness of the stored multiple solutions by comparison of the stored multiple solutions to each other. The one or more modified inputs include the randomly perturbated input or inputs and/or the non-perturbated input or inputs.

20 Claims, 15 Drawing Sheets

U.S. PATENT DOCUMENTS

| | | | |
|---|---|---|---|
| 7,472,094 B2 * | 12/2008 | Hamadi et al. | 706/19 |
| 7,480,639 B2 * | 1/2009 | Bi | 706/12 |
| 7,487,133 B2 * | 2/2009 | Kropaczek et al. | 706/46 |
| 2003/0086520 A1 | 5/2003 | Russell, II et al. | |
| 2004/0101083 A1 | 5/2004 | Russell, II et al. | |
| 2005/0089831 A1 | 4/2005 | Russell, II et al. | |

OTHER PUBLICATIONS

Classification and solving of merge patterns in geometric constraint solving Xiao-Shan Gao; Gui- Fang Zhang; Shape Modeling International, May 12-15, 2003 pp. 89-98 Digital Object Identifier 10.1109/SMI.2003.1199605.*

The Application of the Genetic algorithm-Ant algorithm in the Geometric Constraint SatisfactionGuidelines Cao Chunhong; Zhang Bin; Wang Limin; Li Wenhui; Cognitive Informatics, 2006. ICCI 2006. 5th IEEE International Conference on vol. 1, Jul. 17-19, 2006 pp. 101-106 Digital Object Identifier 10.1109/COGINF.2006.365683.*

The geometric constraint solving based on memory particle swarm algorithm Chun-Hong Cao; Wen-Hui Li; Yong-Jian Zhang; Rong-Qing Yi; Machine Learning and Cybernetics, 2004. Proceedings of 2004 International Conference on vol. 4, Aug. 26-29, 2004 pp. 2134-2139 vol. 4.*

* cited by examiner

METHODS FOR EVALUATING ROBUSTNESS OF SOLUTIONS TO CONSTRAINT PROBLEMS

BACKGROUND

1. Field

Example embodiments relate to methods for evaluating robustness of solutions to constraint problems. Also, example embodiments relate to methods for evaluating robustness of solutions to constraint problems including core design, operational strategy, or core design and operational strategy for nuclear reactors.

2. Description of Related Art

Most problems encountered in engineering design are non-linear by nature and involve the determination of system parameters that satisfy certain goals for the problem being solved. Such problems can be cast in the form of a mathematical optimization problem where a solution is desired that maximizes and/or minimizes one or more system functions or parameters subject to one or more limitations or constraints on the system. Both the system function and constraints are comprised of system inputs (control variables) and system outputs, which may be either discrete or continuous. Furthermore, constraints may be equalities or inequalities. The solution to a given optimization problem has either or both of the following characteristics: (1) minimizes and/or maximizes a desired condition or conditions, thus satisfying the optimality condition; and (2) satisfies a set of constraint equations imposed on the system.

With the above definitions, several categories of optimization problems may be defined. A Free Optimization Problem ("FOP") is one for which no constraints exist. A Constraint Optimization Problem ("COP") includes both constraints and minimize and/or maximize one or more conditions requirement. In contrast, a Constraint Satisfaction Problem ("CSP") contains only constraints. Solving a CSP means finding one feasible solution within the search space that satisfies the constraint condition(s). Solving a COP means finding a solution that is both feasible and optimal in the sense that the minimum and/or maximum value(s) for the one or more desired conditions is/are realized.

The solution to such a problem typically involves a mathematical search algorithm, whereby successively improved solutions are obtained over the course of a number of algorithm iterations. Each iteration, which can be thought of as a proposed solution, hopefully results in improvement of an objective function. An objective function is a mathematical expression having parameter values of a proposed solution as inputs. The objective function produces a figure of merit for the proposed solution. Comparison of objective function values provides a measure as to the relative strength of one solution versus another. Numerous search algorithms exist and differ in the manner by which the control variables for a particular problem are modified, whether a population of solutions or a single solution is tracked during the improvement process, and the assessment of convergence. However, these search algorithms rely on the results of an objective function in deciding a path of convergence. Examples of optimization algorithms include Genetic Algorithms, Simulated Annealing, and Tabu Search.

Within optimization algorithms, the issue of handling constraints for COPs and CSPs must be addressed. Several classes of methods exist for dealing with constraints. The most widespread method is the use of the penalty approach for modifying the objective function, which has the effect of converting a COP or CSP into a FOP. In this method, a penalty function, representing violations in the set of constraint equations, is added to an objective function characterizing the desired optimal condition. When the penalty function is positive, the solution is infeasible. When the penalty function is zero, all constraints are satisfied. Minimizing the modified objective function thus seeks not only optimality but also satisfaction of the constraints.

For a given optimization search, the penalty approach broadens the search space by allowing examination of both feasible and infeasible solutions in an unbiased manner. Broadening the search space during an optimization search often allows local minima to be circumnavigated more readily, thus making for a more effective optimization algorithm. In contrast, alternate methods for handling constraints, such as infeasible solution "repair" and "behavioral memory," are based on maintaining or forcing feasibility among solutions that are examined during the optimization search.

To implement the penalty approach, a mathematical expression is defined for each constraint that quantifies the magnitude of the constraint violation. For the given constraint, a weighting factor then multiplies the result to create an objective function penalty component. Summing all penalty components yields the total penalty. The larger the weighting factor for a given constraint, the greater the emphasis the optimization search will place on resolving violations in the constraint during the optimization search. Many approaches exist for defining the form of the penalty function and the weighting factors. As defined by the resultant modified objective function, weighting factors are problem specific and are bounded by zero (the constraint is not active) and infinity (the search space omits all violations of the constraint).

The simplest penalty function form is the "death penalty," which sets the value of the weighting factor for each constraint to infinity. With a death penalty the search algorithm will immediately reject any violation of a constraint, which is equivalent to rejecting all infeasible solutions. Static penalties apply a finite penalty value to each constraint defined. A static weighting factor maintains its initial input value throughout the optimization search. Dynamic penalties adjust the initial input value during the course of the optimization search according to a mathematical expression that determines the amount and frequency of the weight change. The form of the penalty functions in a dynamic penalty scheme contains, in addition to the initial static penalty weighting factors (required to start the search), additional parameters that must be input as part of the optimization algorithm.

Similar to dynamic penalties, adaptive penalties adjust weight values over the course of an optimization search. In contrast, the amount and frequency of the weight change is determined by the progress of the optimization search in finding improved solutions. Several approaches for implementing adaptive penalty functions have been proposed. Bean and Hadj-Alouane created the method of Adaptive Penalties ("AP"), which was implemented in the context of a Genetic Algorithm. In the AP method, the population of solutions obtained over a preset number of iterations of the optimization search is examined and the weights adjusted depending on whether the population contains only feasible, infeasible, or a mixture of feasible and infeasible solutions. Coit, Smith, and Tate proposed an adaptive penalty method based on estimating a "Near Feasibility Threshold" ("NFT") for each given constraint. Conceptually, the NFT defines a region of infeasible search space just outside of feasibility that the optimization search would then be permitted to explore. Eiben and Hemert developed the Stepwise Adaption of Weights ("SAW") method for adapting penalties. In their method, a weighting factor adjustment is made periodically to each constraint that violates in the best solution, thus potentially biasing future solutions away from constraint violations.

Several deficiencies exist in the penalty methods proposed. Death penalties restrict the search space by forcing all candidate solutions generated during the search to satisfy feasibility. In the static weighting factor approach, one must perform parametric studies on a set of test problems that are reflective of the types of optimization applications one would expect to encounter, with the result being a range of acceptable weight values established for each constraint of interest. The user would then select the weight values for a specific set of constraints based on a pre-established range of acceptable values. Particularly for COPs, varying the static weight values for a given problem can often result in a more or less optimal result. Similarly, dynamic penalties require the specification of parameters that must be determined based on empirical data. Fine-tuning of such parameters will often result in a different optimal result.

Penalty adaptation improves over the static and dynamic penalty approaches by attempting to utilize information about the specific problem being solved as the optimization search progresses. In effect, the problem is periodically redefined. A deficiency with the adaptive penalty approach is that the objective function loses all meaning in an absolute sense during the course of an optimization search. In other words, there is no "memory" that ties the objective function back to the original starting point of the optimization search as exists in a static penalty or dynamic penalty approach.

One known optimization problem involves design of an operational strategy for a nuclear reactor such as a nuclear boiling water reactor ("BWR"). FIG. 1 illustrates a related art BWR. As shown, a pump 100 supplies water to a reactor vessel 102 housed within a containment vessel 104. The core 106 of the reactor vessel 102 includes a number of fuel bundles such as those described in detail below with respect to FIG. 2. The controlled nuclear fission taking place at the fuel bundles in the core 106 generates heat which turns the supplied water into steam. This steam is supplied from the reactor vessel 102 to turbines 108, which power a generator 110. The generator 110 then outputs electrical energy. The steam supplied to the turbines 108 is recycled by condensing the steam from turbines 108 back into water at a condenser 112, and supplying the condensed steam back to the pump 100.

FIG. 2 illustrates a typical fuel bundle 114 in the core 106. A core 106 may include, for example, anywhere from about 200 to about 1200 of these fuel bundles 114. As shown in FIG. 2, the fuel bundle 114 may include an outer channel 116 surrounding a plurality of fuel rods 118 extending generally parallel to one another between upper and lower tie plates 120 and 122, respectively, and in a generally rectilinear matrix of fuel rods as illustrated in FIG. 3, which is a schematic representation of a cross-section or lattice of the fuel bundle 114 of FIG. 2. The fuel rods 118 may be maintained laterally spaced from one another by a plurality of spacers 124 vertically spaced apart from each other along the length of the fuel rods 118 within the outer channel 116. Referring to FIG. 3, there is illustrated in an array of fuel rods 118 (i.e., in this instance, a 10×10 array) surrounded by the outer channel 116. The fuel rods 118 are arranged in orthogonally related rows and also surround one or more "water rods," two water rods 126 being illustrated. The fuel bundle 114 may be arranged, for example, in one quadrant of a control blade 128 (also known as a "control rod"). It will be appreciated that other fuel bundles 114 may be arranged in each of the other quadrants of the control blade 128. Movement of the control blade 128 up and/or down between the fuel bundles 114 controls the amount of reactivity occurring in the fuel bundles 114 associated with that control blade 128.

A nuclear reactor core includes many individual components that have different characteristics that may affect a strategy for efficient operation of the core. For example, a nuclear reactor core has many (i.e., several hundred) individual fuel assemblies (bundles) that have different characteristics and that must be arranged within the reactor core (or "loaded") so that the interaction between the fuel bundles satisfies all regulatory and reactor design constraints, including governmental and customer-specified constraints. Similarly, other controllable elements and factors that affect the reactivity and overall efficiency of a reactor core must also be taken into consideration if one is to design or develop an effective strategy for optimizing the performance of a reactor core at a particular reactor plant. Such "operational controls" (also referred to interchangeably in this application as "independent control-variables" and "design inputs") include, for example, various physical component configurations and controllable operating conditions that may be individually adjusted or set.

Besides fuel bundle "loading," other independent control-variables include, for example, "core flow" or rate of water flow through the core, the "exposure," and the "reactivity" or interaction between fuel bundles within the core due to differences in bundle enrichment, and the "rod pattern" or distribution and axial position of control blades within the core. As such, each of these operational controls constitutes an independent control-variable or design input that has a measurable effect on the overall performance of the reactor core. Due to the vast number of possible different operational values and combinations of values that these independent control-variables can assume, it is a formidable challenge and a very time consuming task, even using known computer-aided methodologies, to attempt to analyze and optimize all the individual influences on core reactivity and performance.

For example, the number of different fuel bundle configurations possible in the reactor core may be in excess of one hundred factorial. Of the many different loading pattern possibilities, only a small percentage of these configurations may satisfy all of the requisite design constraints for a particular reactor plant. In addition, only a small percentage of the configurations that satisfy all of the applicable design constraints may be economically feasible.

Moreover, in addition to satisfying various design constraints, since a fuel bundle loading arrangement ultimately affects the core cycle energy (i.e., the amount of energy that the reactor core generates before the core needs to be refueled with fresh fuel bundles), a particular loading arrangement should to be selected that may optimize the core cycle energy.

In order to furnish and maintain the required energy output, the reactor core is periodically refueled with fresh fuel bundles. The duration between one refueling and the next is commonly referred to as a "fuel cycle" or "core cycle" of operation and, depending on the particular reactor plant, is on the order of twelve to twenty-four (typically eighteen) months. At the time of refueling, typically one third of the least reactive fuel bundles are removed from the reactor and the remaining fuel bundles are repositioned before fresh fuel bundles are added. Generally, to improve core cycle energy, higher reactivity bundles should be positioned at interior core locations. However, such arrangements are not always possible to achieve while still satisfying plant-specific design constraints. Since each fuel bundle may be loaded at a variety of different locations relative to other bundles, identifying a core loading arrangement that produces optimum performance of the core for each fuel cycle presents a complex and computation-intensive optimization problem that may be very time consuming to solve.

During the course of a fuel cycle, the excess energy capability of the core, defined as the excess reactivity or "hot excess," is controlled in several ways. One technique employs a burnable reactivity inhibitor (i.e., Gadolinia) incorporated into the fresh fuel. The quantity of initial burnable inhibitor is determined by design constraints and performance characteristics typically set by the utility and by the Nuclear Regulatory Commission ("NRC"). The burnable inhibitor controls most, but not all, of the excess reactivity. Consequently, control blades—that inhibit reactivity by absorbing nuclear emissions—are also used to control excess reactivity. Typically, a reactor core contains many such control blades that are fitted between selected fuel bundles and are axially positionable within the core. These control blades assure safe shut down and provide the primary mechanism for controlling a maximum core power peaking factor.

The total number of control blades utilized varies with core size and geometry, and may be, for example, between about 50 and about 175. The axial position of the control blades (i.e., fully inserted, fully withdrawn, or somewhere in between) is based on the need to control the excess reactivity and to meet other operational constraints, such as the maximum core power peaking factor. For each control blade, there may be, for example, 24, 48, or more possible axial positions or "notches" and 40 "exposure" (i.e., duration of use) steps. Considering symmetry and other requirements that reduce the number of control blades that are available for application at any given time, there are many millions of possible combinations of control blade positions for even the simplest case. Of these possible configurations, only a small fraction may satisfy all applicable design and safety constraints, and of these, only a small fraction may be economically feasible. Moreover, the axial positioning of control blades also influences the core cycle energy that any given fuel loading pattern can achieve. Since it is desirable to maximize the core cycle energy in order to minimize nuclear fuel cycle costs, developing an optimum control blade positioning strategy presents another formidable independent control-variable optimization problem that must also be taken into consideration when attempting to optimize fuel-cycle design and management strategies.

Control blades are typically grouped and assigned a designation, such as 'A1', 'A2,' 'B1,' and 'B2'. Only the control blades within a specified group may be used for control of the reactor over a designated period of time. For example, dividing the core into 8 exposure periods (i.e., time periods) of 2 months each, a typical operational strategy might be the ordered use of blades within the following groups: 'B1,' 'A1,' 'B2,' 'A2,' 'B1,' 'A1,' 'B2,' 'A2' The time boundary between any two groups is called a sequence exchange, such as 'B1'→'A1' which occurs at the completion of the first 2 month period. Within a group, individual control blades are placed at notch positions, which correspond to a certain fraction of insertion. For example, notch 48 corresponds to completely withdrawn while notch 0 corresponds to completely inserted. Symmetric blades may be ganged and will therefore move in unison. Typically symmetries are octant, quarter-core (mirror or rotational), and half-core rotational.

Control blades are moved to control local power within the reactor core as the fuel depletes as well as to control the reactivity of the core. In conjunction with control blades, core flow may also be used as a control mechanism. The higher the core flow, the more the core reactivity and vice-versa. Similarly, the deeper a control blade is inserted, the lower the core reactivity and vice-versa. The impact of a given blade on core reactivity and local power depends on a number factors including: (1) the location of the blade—blades near the core periphery in low power regions have less of an impact than those in higher power regions such as near the center; (2) the characteristics of the fuel bundles surrounding the blade (i.e., fresh fuel or highly exposed fuel); (3) the number of symmetric partners (a ganging of 8 control blades has greater impact than a ganging of 4 control blades); (4) the core exposure; and (5) the current core state power distribution (inserting a blade for an axially bottom-peak power shape will have greater impact than for a top-peaked power shape).

Core design and the development of an operational strategy typically involves a constraint optimization problem wherein a best possible solution that maximizes energy output is developed according to various well-known algorithms. For example, a reactor core and operational strategy may be designed to generate a certain amount of energy measured in gigawatt days per metric ton ("GWd/mt") of uranium over a fuel cycle before being replaced with a new core.

As discussed above, developing a solution to such a constraint problem typically involves a mathematical search algorithm, whereby successively improved solutions are obtained over the course of a number of algorithm iterations. Each iteration, which can be thought of as a proposed solution, hopefully results in improvement of an objective function, producing a figure of merit for the proposed solution. Comparison of objective function values provides a measure as to the relative strength of one solution versus another. Numerous search algorithms for core and operational strategy design exist that rely on the results of an objective function in deciding a path of convergence.

At the beginning of cycle ("BOC"), the core design is put into operation. As is also typical, actual reactor performance often deviates from the performance modeled in generating the core design. Adjustments from the operational model are quite often made in order to maintain performance of the reactor before the end of cycle ("EOC"). Accordingly, the desire for robustness in a design solution arises from the fact that the assumptions that form the basis of a given design may change once the plant starts operating. Assumptions fall into several categories. First, there are assumed operational conditions of the plant that include, for example, the power level, flow, and inlet temperature. Second, there are assumed biases in the simulation model that are based on historical data. As is known, developing a core and/or operational strategy design solution involves running simulations of the reactor using a proposed solution and using outputs from the simulation as inputs to an objective function, which provides a figure of merit for the propose solution. Numerous simulation programs for simulating reactor performance are known in the art. An example of a simulation model bias is the core eigenvalue, which is a measure of core reactivity or neutron balance, at hot and cold conditions as function of cycle exposure (for a critical core the eigenvalue should be 1.00 but typically ranges between 0.99 and 1.01).

Another category of assumption is assumed margins in the simulation model for each of the thermal and reactivity parameters. Design margins are introduced to account for uncertainties in the simulation model and to assure that once the plant starts operating, thermal and reactivity limits are not violated (the so-called operating margin). Examples of reactivity limits include cold shutdown margin ("CSDM") and hot excess reactivity ("HOTX"). Examples of thermal limits include MFLPD (Maximum Fraction of Limiting Power Density), MAPRAT (maximum power ratio), and MFLCPR (Maximum Fraction of Limiting Critical Power Ratio).

CSDM is defined as the reactivity margin to the limit for the reactor in a cold state, with all control blades inserted except for the most reactive control blade. CSDM may be determined for each exposure state-point during the fuel cycle. HOTX is defined as the core reactivity for the reactor in a hot state, with all control blades removed. Similar to CSDM, HOTX may be determined for each exposure state-point during the fuel cycle.

MFLPD is defined as the maximum of the ratio of local rod power or linear heat generation rate ("LHGR"; measured, for example, in kilowatts per unit length) in a given bundle at a given elevation, as compared to its limiting value. MAPLHGR is the maximum average linear heat generation rate over a plane in a given bundle at a given elevation in the core. MAPRAT is simply the ratio of MAPLHGR to its limiting value.

LHGR limits protect the fuel against the phenomena of fuel cladding plastic strain, fuel pellet centerline melting, and lift-off (bulging of the cladding that exceeds the expansion of the pellet, due primarily to fission gas buildup). Lift-off degrades heat transfer from the pellet across the cladding to the coolant. MAPRAT limits protect the fuel during a postulated loss of coolant accident ("LOCA"), while MFLPD limits protect the fuel during normal operation.

MFLCPR protects the fuel against the phenomena of "film dryout." In BWR heat transfer, a thin film of water on the surface of the fuel rod assures adequate removal of the heat generated in the fuel rod as water is converted into steam. This mechanism, also known as nucleate boiling, will continue as the power in the fuel rod is increased up until a point referred to as transition boiling (also known as departure from nucleate boiling or "DNB"). During transition boiling, heat transfer degrades rapidly leading to the elimination of the thin film and ultimately film dryout, at which time the cladding surface temperature increases rapidly, possibly leading to cladding failure. The critical power of the bundle is the power at which a given fuel bundle achieves film dryout, and is determined from experimental tests. The Critical Power Ratio ("CPR") is the ratio of the critical power to the actual bundle power. MFLCPR is simply the maximum over all bundles of the fraction of each bundle's CPR to its limiting value.

Operating margins may be communicated to a core monitoring system, and are derived from plant measurement or instrumentation systems. In a BWR, the instrumentation systems may include fixed detectors and removable detectors. The removable detectors, or TIPS (traversing in-core probes), are inserted each month to calibrate the fixed detectors. This is due to the fact that the fixed detectors will "burn out" due to the neutron environment and so must have their signals adjusted. As will be appreciated, however, in a simulator the measurements are simulated. A loss of operating margin may require adjustment of the control blade pattern and/or core flow in order to redistribute the power. The control blade pattern is the amount by which each of the control blades is inserted into the core and how these positions are planned to change over time. Core flow is the flow of water through the core.

Changes in any of the design assumptions—operational conditions, model biases, or margins—may require changes in the reactor control parameters once the plant begins operation. Avoidance of abrupt changes in core output response (i.e., local power) due to a required change in one of the independent control-variables (i.e., axial position of one or more control blades) is important from the perspective of plant safety as well as ease of operation.

Core design is currently performed using a fixed set of assumptions. This method of design does not provide information as to the robustness of a given solution. A design may satisfy all design margins for the input set of assumption but may prove to have reduced margins (or worse, approach violations in thermal and/or reactivity limits) during plant operation. In such instances, the reactor operators would modify the operational strategy (control blade pattern and/or core flow) to recover at least some of the lost margin. Typically, such modifications to the operational strategy would be first simulated using the on-line predictive capabilities of the core monitoring system, beginning with a "snapshot" of the plant state based on the plant measurement and operating conditions. During the simulation of these various scenarios, the degree of robustness of the current solution will become evident. Robust solutions should have low sensitivity to modifications in operational strategy. A solution that is brittle may require additional operational maneuvering (such as using an alternate group of control blades) in order to achieve a robust solution. This maneuvering may require a reduction in core power (and lost electrical generation) during the "transition" maneuver to the new core state.

An alternative method is to perform a simulation of the base design with a single change in one of the design parameters and validate that a success path—involving a change in operational strategy—exists for satisfying the thermal and reactivity limits. For example, one could change the target hot eigenvalue from 1.000 to 1.003 over the fuel cycle and manually perturb control blades and core flow within the simulation to satisfy thermal and reactivity limits. If no such success path existed, it would be necessary to change the overall design. Examples of such changes would be to perform fuel shuffles, utilize a different set of control blades (i.e., an A1 sequence versus an A2 sequence), or modify the fresh fuel bundle design. This process is extremely time consuming and can only examine singular changes in the design parameters.

SUMMARY

Example embodiments may provide methods for evaluating robustness of solutions to constraint problems. Also, example embodiments may provide methods for evaluating robustness of solutions to constraint problems including core design, operational strategy, or core design and operational strategy for nuclear reactors.

In an example embodiment, a method for evaluating robustness of solutions to a constraint problem may include: (a) determining one or more inputs for the constraint problem; (b) determining bias, uncertainty, or bias and uncertainty of the one or more inputs; (c) randomly perturbating at least one of the one or more inputs based on the bias, uncertainty, or bias and uncertainty of the one or more inputs to determine one or more modified inputs; (d) generating a solution to the constraint problem based on the one or more modified inputs; (e) storing the solution; (f) repeating (c) through (e) until multiple solutions are stored; and/or (g) determining the robustness of the stored multiple solutions by comparison of the stored multiple solutions to each other. The one or more modified inputs may include the randomly perturbated input or inputs and/or the non-perturbated input or inputs.

In another example embodiment, method for evaluating robustness of solutions to a constraint problem may include: (a) determining one or more inputs for the constraint problem; (b) determining bias, uncertainty, or bias and uncertainty of the one or more inputs; (c) randomly perturbating at least one of the one or more inputs based on the bias, uncertainty, or bias and uncertainty of the one or more inputs to determine one or more modified inputs; (d) generating a solution to the constraint problem based on the one or more modified inputs; (e) determining whether the solution satisfies the constraint problem; (f) storing the solution, if the solution satisfies the constraint problem; (g) repeating (c) through (f) until multiple solutions that satisfy the constraint problem are stored; and/or (h) determining the robustness of the stored multiple solutions by comparison of the stored multiple solutions to each other. The one or more modified inputs may include the randomly perturbated input or inputs and/or the non-perturbated input or inputs.

In yet another example embodiment, a method for evaluating robustness of solutions to a constraint problem may include: (a) determining one or more inputs for the constraint problem; (b) determining bias, uncertainty, or bias and uncertainty of the one or more inputs; (c) randomly perturbating at least one of the one or more inputs based on the bias, uncertainty, or bias and uncertainty of the one or more inputs to determine one or more modified inputs; (d) generating a solution to the constraint problem based on the one or more modified inputs; (e) determining whether the solution satisfies the constraint problem; (f) modifying one or more parameters and repeating (d) and (e), if the solution does not satisfy the constraint problem; (g) storing the solution, if the solution satisfies the constraint problem; (h) repeating (c) through (g) until multiple solutions that satisfy the constraint problem are stored; and/or (i) determining the robustness of the stored multiple solutions by comparison of the stored multiple solutions to each other. The one or more modified inputs may include the randomly perturbated input or inputs and/or the non-perturbated input or inputs.

In a further example embodiment, a method for evaluating robustness of solutions to a constraint problem may include: (a) determining one or more inputs for the constraint problem; (b) determining bias, uncertainty, or bias and uncertainty of the one or more inputs; (c) randomly perturbating at least one of the one or more inputs based on the bias, uncertainty, or bias and uncertainty of the one or more inputs to determine one or more modified inputs; (d) generating a solution to the constraint problem based on the one or more modified inputs; (e) determining whether the solution satisfies the constraint problem; (f) modifying one or more parameters and repeating (d) and (e), if the solution does not satisfy the constraint problem; (g) determining whether the solution optimizes the constraint problem, if the solution satisfies the constraint problem; (h) storing the solution, if the solution satisfies and optimizes the constraint problem; (i) repeating (c) through (h) until multiple solutions that satisfy and optimize the constraint problem are stored; and/or (j) determining the robustness of the stored multiple solutions by comparison of the stored multiple solutions to each other. The one or more modified inputs may include the randomly perturbated input or inputs and/or the non-perturbated input or inputs.

In yet a further example embodiment, a method for evaluating robustness of solutions to a constraint problem may include: (a) determining one or more inputs for the constraint problem; (b) determining bias, uncertainty, or bias and uncertainty of the one or more inputs; (c) randomly perturbating at least one of the one or more inputs based on the bias, uncertainty, or bias and uncertainty of the one or more inputs to determine one or more modified inputs; (d) generating a solution to the constraint problem based on the one or more modified inputs; (e) determining whether the solution satisfies the constraint problem; (f) modifying one or more parameters and repeating (d) and (e), if the solution does not satisfy the constraint problem; (g) determining whether the solution optimizes the constraint problem, if the solution satisfies the constraint problem; (h) modifying the one or more parameters and repeating (d) through (g), if the solution does not optimize the constraint problem; (i) storing the solution, if the solution satisfies and optimizes the constraint problem; (j) repeating (c) through (i) until multiple solutions that satisfy and optimize the constraint problem are stored; and/or (k) determining the robustness of the stored multiple solutions by comparison of the stored multiple solutions to each other. The one or more modified inputs may include the randomly perturbated input or inputs and/or the non-perturbated input or inputs.

Robustness may be defined as having low sensitivity to the random perturbations. As a result, more robust solutions should have lower sensitivity to the random perturbations than less robust solutions. Stated in another way, robustness may be thought of as a measure of flexibility of the solutions to the constraint problems.

Because the random perturbations in the methods of the example embodiments account for bias, uncertainty, or bias and uncertainty of the one or more inputs, no additional safety margin—such as the design margins of the related art—is required.

In the example embodiments, the inputs may include independent control-variables, dependent variables, thermal limits, and/or reactivity limits.

Example embodiments may be used to compare competing reactor designs. Also, given a reactor design, example embodiments may be used to determine the most robust operational strategy at BOC. Similarly, given a reactor design, example embodiments may be used to determine the most robust operational strategy starting from any point during the fuel cycle. Additionally, example embodiments may be used to determine the most robust operational strategy in the event of a "leaking" control blade, for which the recovery actions may include completely inserting the respective control blade and shutting down the reactor, plugging the leak, starting up the reactor with the respective control blade fully inserted, and then continuing critical reactor operation.

In addition or in the alternative, example embodiments may be used to determine the maximum energy gain over a fuel cycle due to $Pu^{239}$ buildup near the top of the core (the $Pu^{239}$ is converted from $U^{238}$; the process of shifting a portion of power production to the $Pu^{239}$ is referred to as "spectral shift"); to determine the highest confidence level of a given energy gain over the fuel cycle; and/or to determine the highest energy gain at a given confidence level over the fuel cycle. The example embodiments may also be used to reduce fuel enrichment and/or loading through reliance on spectral shift. One of ordinary skill in the art will recognize many other potential uses.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
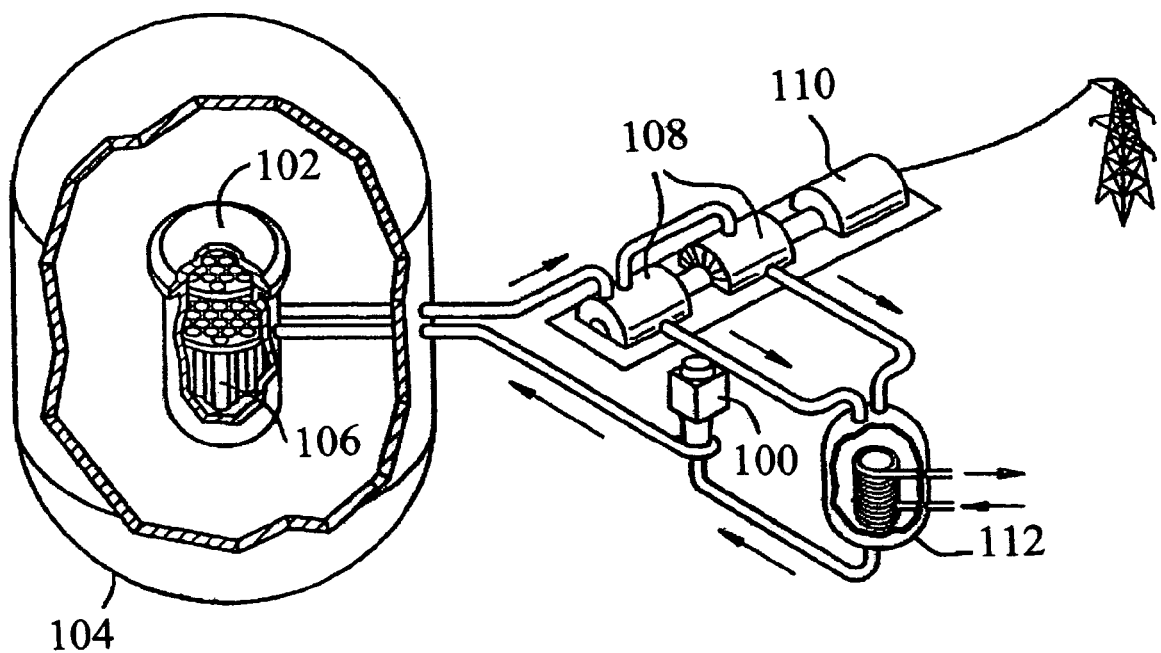
FIG. 1 illustrates a related art BWR.
Figure 2:
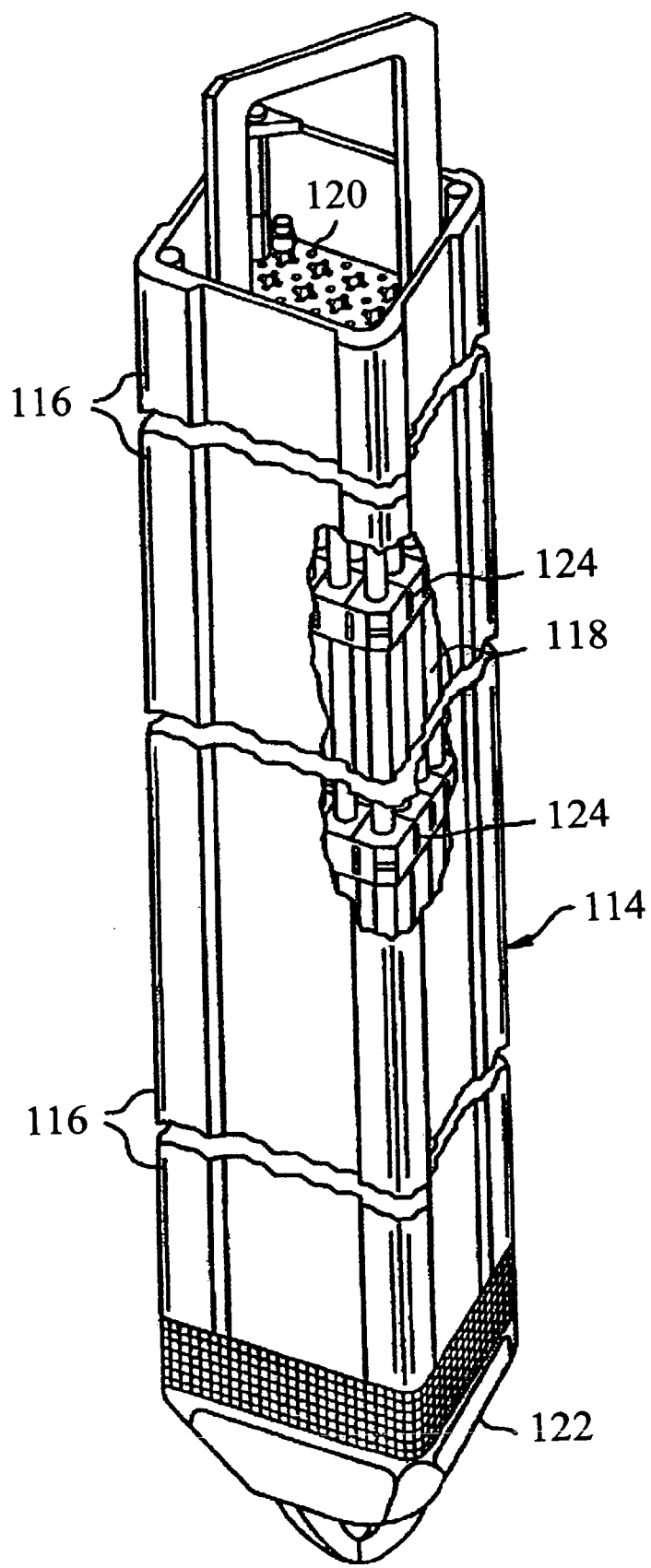
FIG. 2 illustrates a fuel bundle in the core of FIG. 1.
Figure 3:
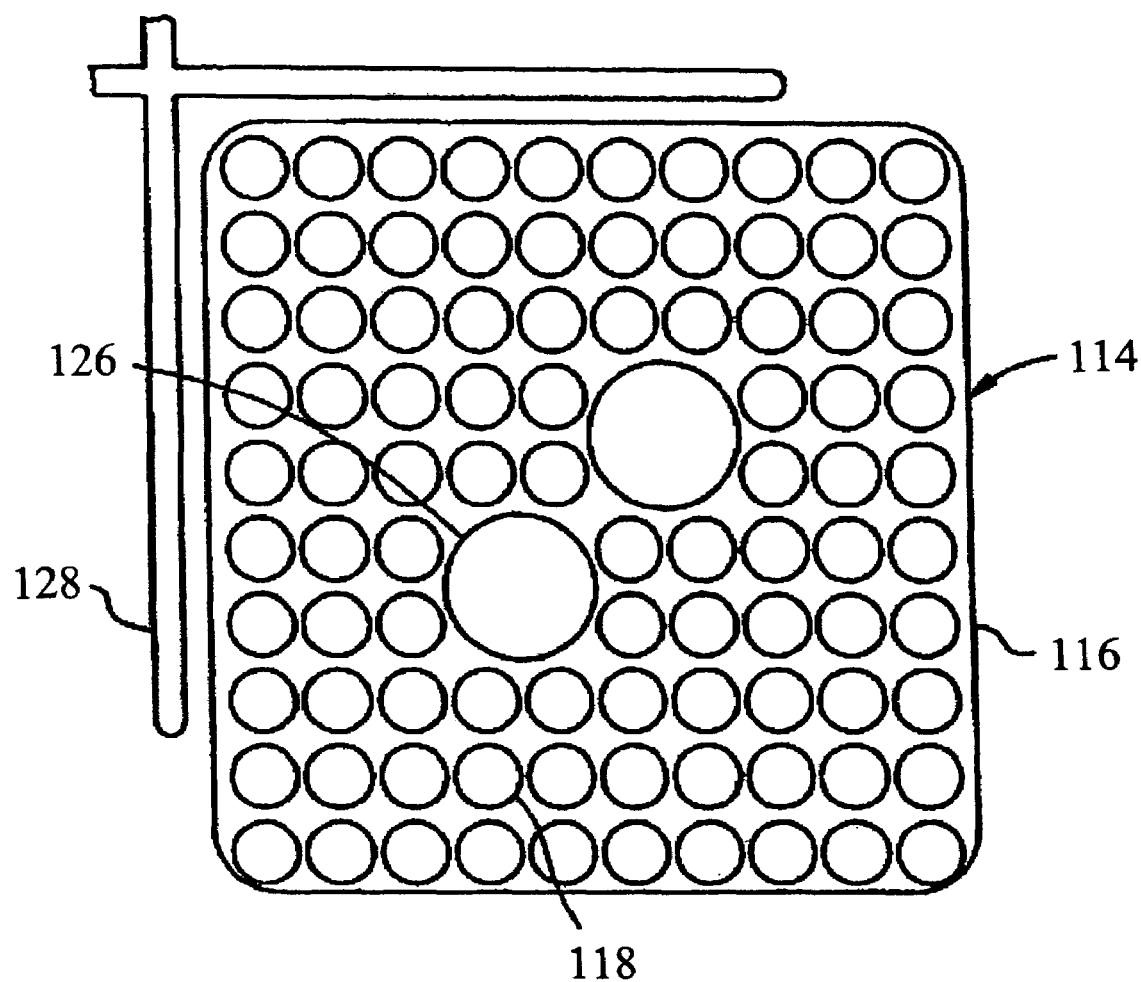
FIG. 3 is a schematic representation of a cross-section or lattice of the fuel bundle of FIG. 2.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art.

As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the example embodiments.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals refer to the like components throughout.

While the example embodiments may be described as applied to a BWR, it will be understood by those of ordinary skill in the art that the present invention may be equally applicable, for example, to pressurized water reactors and/or other constraint problems.

Figure 4:
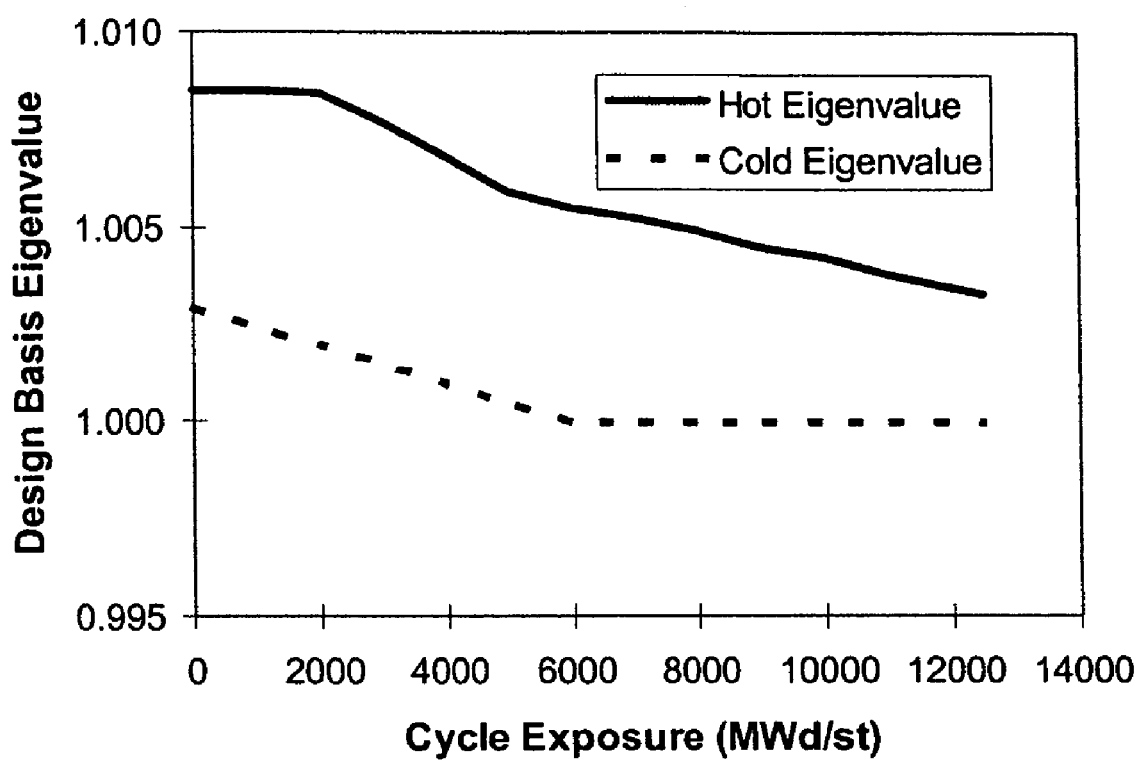
FIG. 4 is a typical graph of independent control-variables versus cycle exposure of a reactor core.

FIG. 4 is a typical graph of independent control-variables versus cycle exposure of a reactor core. In FIG. 4, the independent control-variables are target hot critical eigenvalue and target cold critical eigenvalue. The target hot and cold critical eigenvalues represent critical core conditions as calculated by a reactor core simulation model. As can be seen, target hot critical eigenvalue varies from about 1.008 to about 1.003 over a fuel cycle exposure of about 13,000 megawatt days per standard ton ("MWd/st") of uranium. As also can be seen, target cold critical eigenvalue varies from about 1.003 to about 1.000 over the fuel cycle exposure of about 13,000 MWd/st. Generally, target hot and cold critical eigenvalues may be, at least in part, a function of the particular core simulation code(s) employed. Core simulation codes—such as PANACEA, MICROBURN, and SIMULATE—are known to one of ordinary skill in the art.

Measured values of independent control-variables—such as hot and cold critical eigenvalue—during reactor operation may not agree with their predicted values. These differences between measured and predicted values may show bias, uncertainty, or bias and uncertainty. Related art methods for predicting core performance may elect, for example, a conservative (worst case) or "best fit" (mean value) approach to determine values for one or more independent control-variables. In contrast, example embodiments may elect to randomly perturbate one or more independent control-variables based on bias, uncertainty, or bias and uncertainty of the one or more independent variables. These random perturbation of the one or more independent control-variables to determine their effect on the dependent variables can be analogized to forming response surfaces that map the independent control-variables to the dependent variables.

Figure 5:
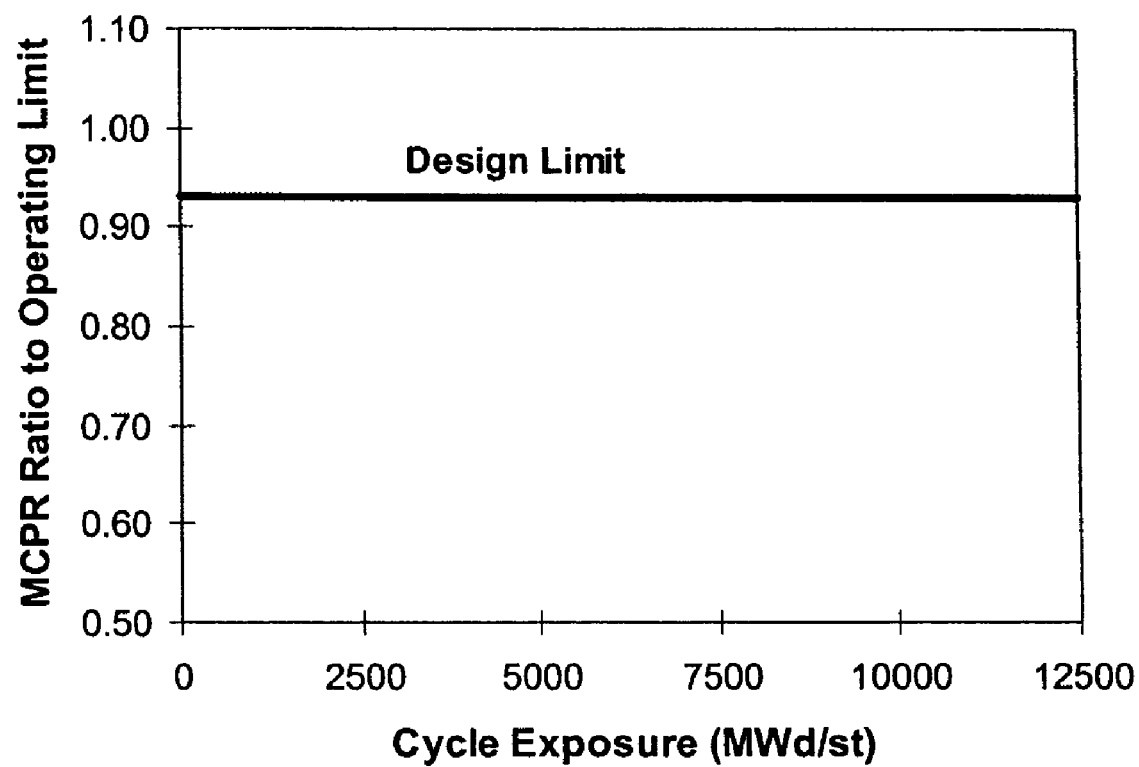
FIG. 5 is a typical graph of a design limit for a dependent variable versus cycle exposure of a reactor core.

FIG. 5 is a typical graph of a design limit for a dependent variable versus cycle exposure of a reactor core. In FIG. 5, the dependent variable is the ratio defined by the Minimum Critical Power Ratio ("MCPR") divided into the MCPR operating limit. As can be seen, the design limit is fixed at a ratio of approximately 0.93:1.00 over the fuel cycle exposure of about 12,500 MWd/st.

Measured values of dependent variables—such as the ratio defined by the MCPR divided into the MCPR operating limit—during reactor operation may not agree with their predicted values. These differences between measured and predicted values may show bias, uncertainty, or bias and uncertainty. Related art methods for predicting core performance may elect, for example, a conservative approach by setting design limits for dependent variables on the conservative side of the operating limits for the dependent variables by a fixed safety margin to account for bias and uncertainty of the dependent variables. In contrast, example embodiments may elect to randomly perturbate one or more independent control-variables based on bias, uncertainty, or bias and uncertainty of the one or more independent control-variables. In addition or in the alternative, example embodiments may elect to randomly perturbate one or more design limits based on bias, uncertainty, or bias and uncertainty of the one or more dependent variables.

Figure 6:
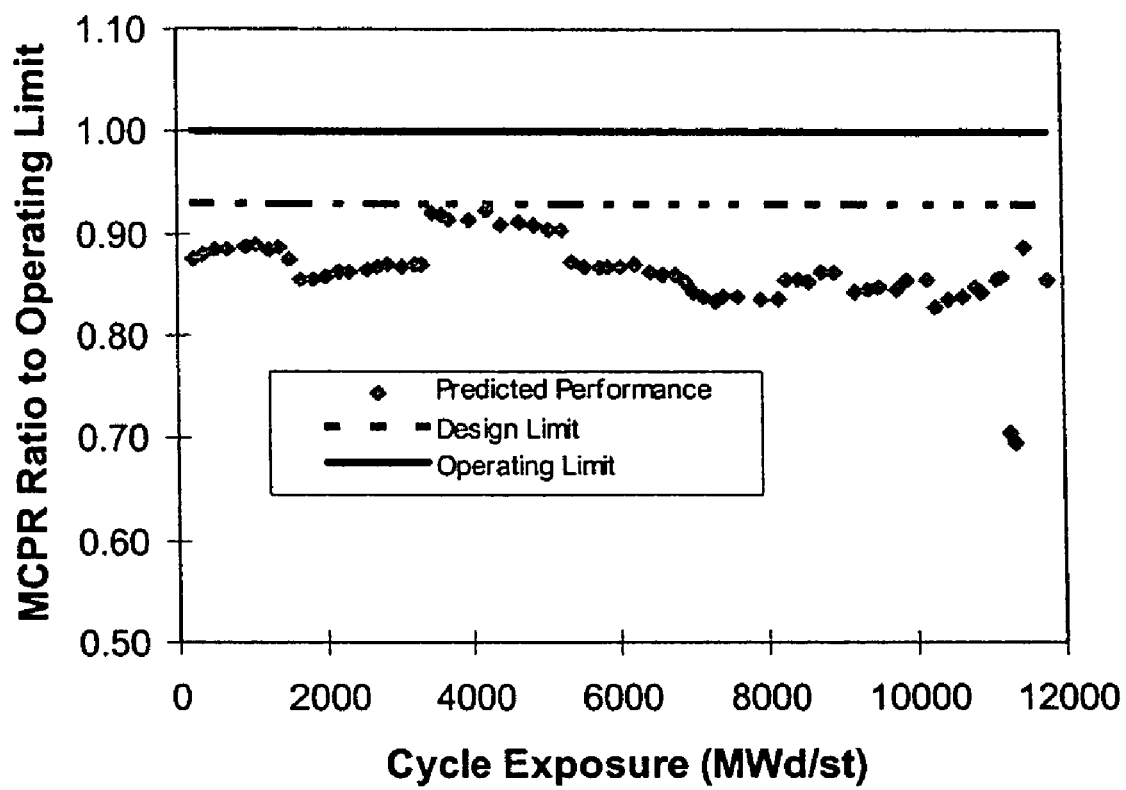
FIG. 6 is a typical graph of an operating limit, a design limit, and predicted performance for a dependent variable versus cycle exposure of a reactor core.

FIG. 6 is a typical graph of an operating limit, a design limit, and predicted performance for a dependent variable versus cycle exposure of a reactor core. In FIG. 6, the dependent variable is the ratio of MCPR to the MCPR operating limit. As can be seen, the predicted performance generally follows the design limit (step changes in the values of the MCPR Ratio to Operating Limit may reflect, for example, control blade sequence exchange and/or off-nominal-power conditions). The operating limit is fixed at a ratio of 1.00:1.00, the design limit is fixed at a ratio of approximately 0.93:1.00, and the predicted performance varies between a value of about 0.83 and a value of about 0.92 over the fuel cycle exposure of about 12,000 MWd/st (with the exception of the two data points discussed above). The predicted performance may be determined in equal or unequal intervals. The intervals, typically in terms of cycle exposure (i.e., MWd/st), may be of any desired length. For example, the intervals may be of 25 MWd/st, 50 MWd/st, 75 MWd/st, 100 MWd/st, 125 MWd/st, 150 MWd/st, 200 MWd/st, 250 MWd/st, or 500 MWd/st.

When designing a reactor, the predicted performance of dependent variables may be compared to their respective design limits and, if necessary, modifications to core design (i.e., fuel enrichment, fuel bundle distribution, burnable poison loading, etc.) and operational strategy (i.e., control blade pattern and/or core flow) may be made to ensure that the design limits are satisfied.

Figure 7:
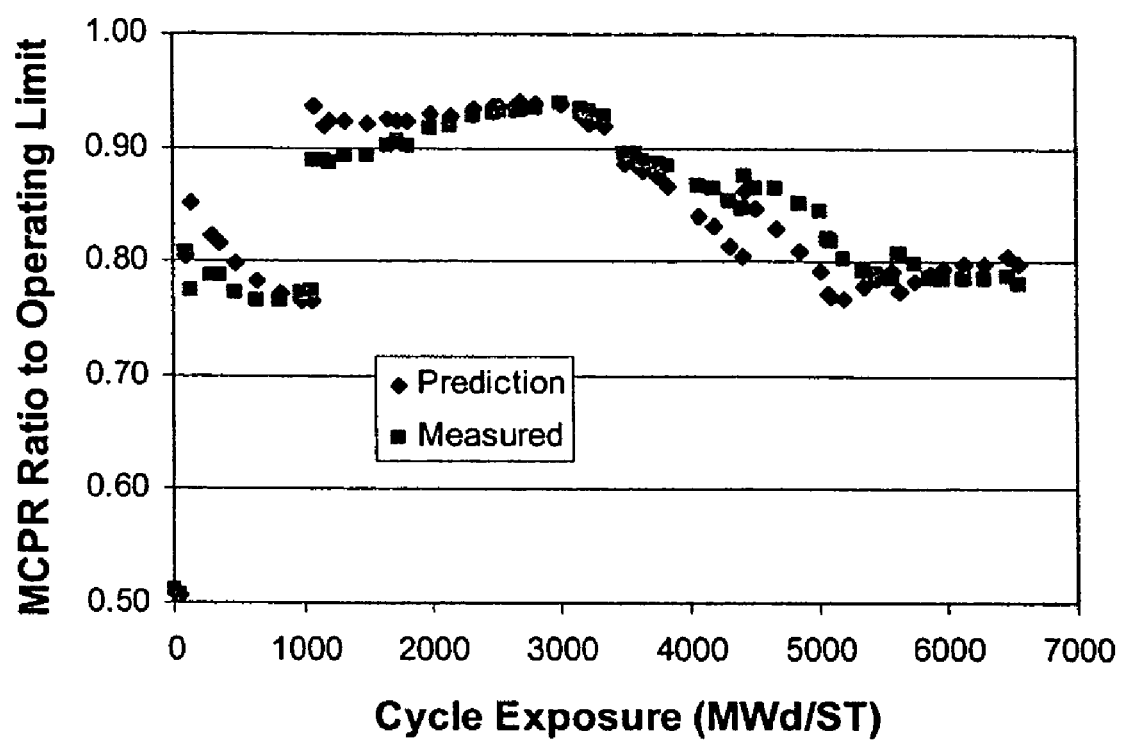
FIG. 7 is a typical graph of a predicted performance and a measured performance for a dependent variable versus cycle exposure of a reactor core.

FIG. 7 is a typical graph of predicted performance and measured performance for a dependent variable versus cycle exposure of a reactor core. In FIG. 7, the dependent variable is the ratio of MCPR to the MCPR operating limit. As can be seen, the measured performance generally follows the predicted performance (step changes in the values of the MCPR Ratio to Operating Limit may reflect, for example, control blade sequence exchange and/or off-nominal-power conditions). The predicted performance varies between a value of about 0.76 and a value of about 0.93 over the fuel cycle exposure of about 6,700 MWd/st, and the measured performance also varies between a value of about 0.76 and a value of about 0.93 over the fuel cycle exposure of about 6,700 MWd/st (with the exception of the two data points discussed above). The predicted and measured performances may be determined in equal or unequal intervals. The intervals, typically in terms of cycle exposure (i.e., MWd/st), may be of any desired length. For example, the intervals may be of 25 MWd/st, 50 MWd/st, 75 MWd/st, 100 MWd/st, 125 MWd/st, 150 MWd/st, 200 MWd/st, 250 MWd/st, or 500 MWd/st.

The differences between predicted performance and measured performance as shown, for example, in FIG. 7 give rise to the bias, uncertainty, or bias and uncertainty that are accounted for in related art reactor design processes by the use of design margins.

Figure 8:
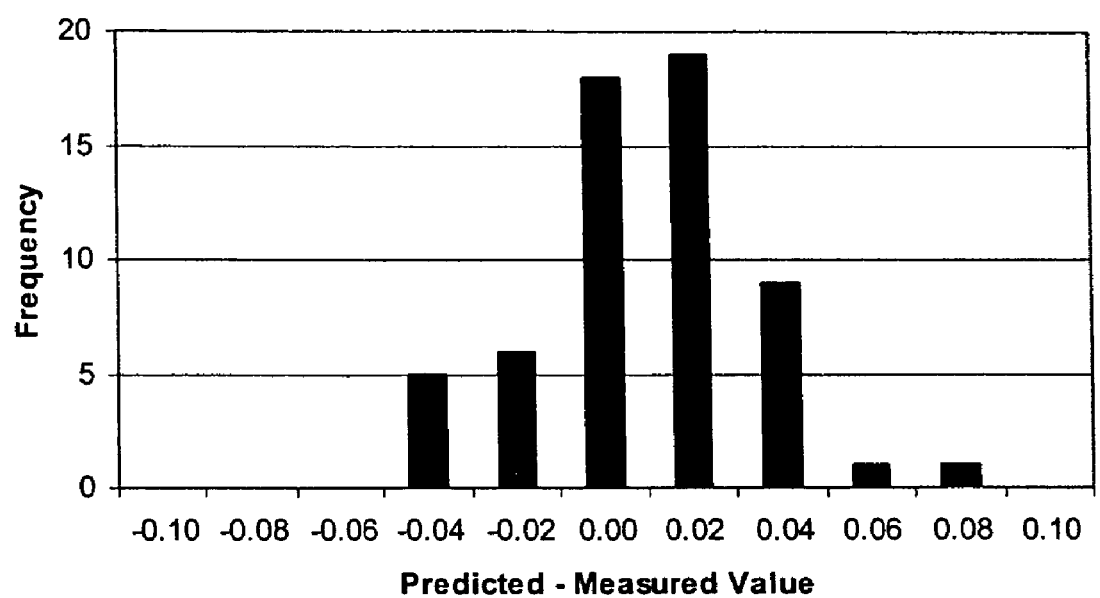
FIG. 8 is an example of a histogram of differences between predicted performance and measured performance for a dependent variable versus cycle exposure of a reactor core.

FIG. 8 is an example of a histogram of differences between predicted performance and measured performance for a dependent variable versus cycle exposure of a reactor core. In FIG. 8, the dependent variable is the MFLCPR thermal margin. As can be seen, the differences between predicted performance and measured performance vary between a value of −0.04 and a value of +0.08. The histogram of FIG. 8 represents historically determined data.

For purposes of calculation, tabulation, graphing, etc., the width of the "bins" for the difference values may be larger or smaller, as desired. In FIG. 8, for example, the bin width for the "predicted−measured value" is 0.02 (i.e., from −0.05 to −0.03, from −0.03 to −0.01, from −0.01 to +0.01, etc.). Therefore, the values in the 0.00 bin may or may not reflect a zero difference exactly. Instead, their values may be, for example, greater than −0.01 and less than or equal to 0.01.

As can be seen in FIG. 8, a small positive bias and some uncertainty exist in the histogram data. From a statistical standpoint, a mean value of the bias in FIG. 8 is approximately 0.01, and a standard deviation of the bias in FIG. 8 is approximately 0.02.

Figure 9:
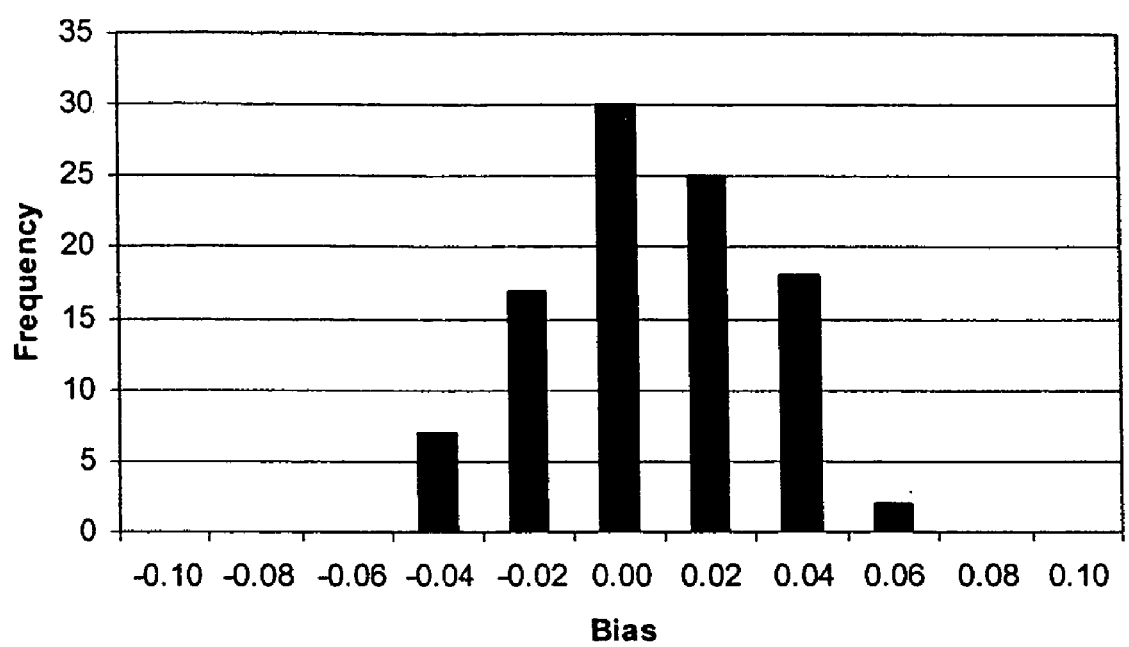
FIG. 9 is a histogram representing a statistical approximation of the histogram of FIG. 8.

FIG. 9 is a histogram representing a statistical approximation of the histogram of FIG. 8, showing the small positive bias and the uncertainty, with a mean value of approximately 0.01 and a standard deviation of approximately 0.02. The histogram of FIG. 9 represents a statistical approximation of the historically determined data of FIG. 8.

Random perturbations may be calculated and/or applied using data from the histogram of FIG. 8 and/or the histogram of FIG. 9 with, for example, a random number generator. Because of its nature as a statistical approximation, the data from the histogram of FIG. 9 may ease such calculations and/or applications.

Figure 10:
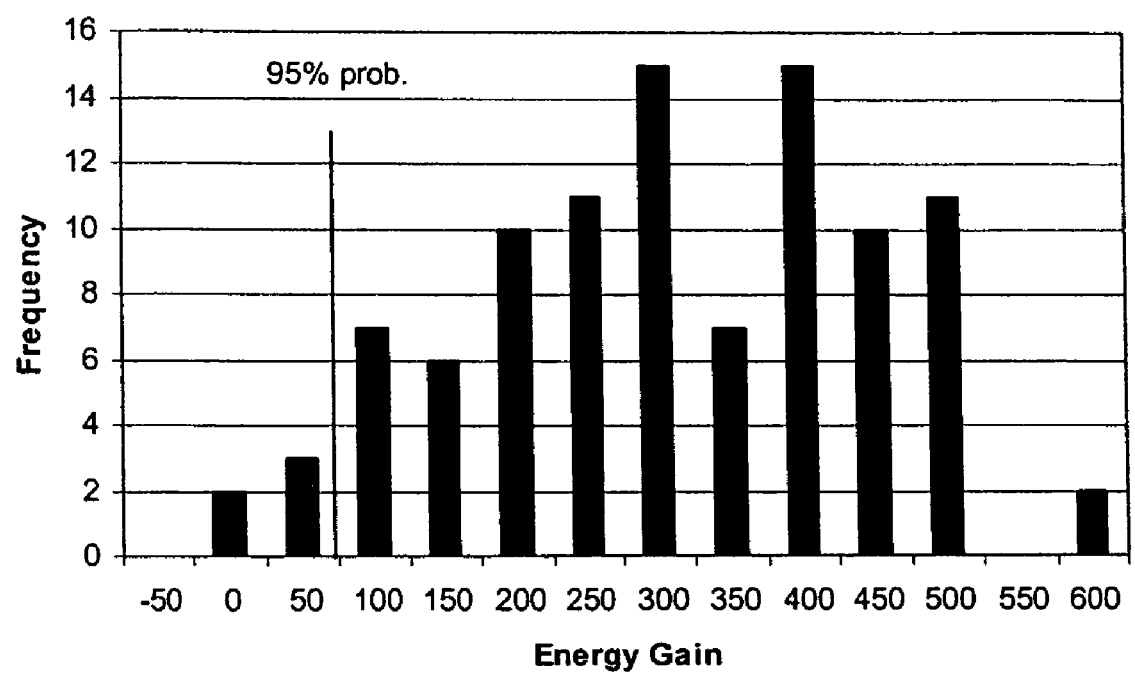
FIG. 10 is histogram of expected energy gain for a fuel cycle from applying the statistical approximation of FIG. 9 over many trials.

FIG. 10 is histogram of expected energy gain for a fuel cycle from applying the statistical approximation of FIG. 9 over many trials. As discussed above, the energy gain is due to $Pu^{239}$ buildup near the top of the core. The $Pu^{239}$ is converted from $U^{238}$. The process of shifting a portion of power production to the $Pu^{239}$ is referred to as "spectral shift."

Each trial may produce a different core cycle energy because the operating strategy may be modified, for example, to ensure that one or more design limits are satisfied, that the one or more design limits are satisfied with little residual margin(s), and/or that the one or more design limits are satisfied with no residual margin(s). Eliminating margin while focusing on achieving maximum energy, for example, may result in an energy gain for the vast majority of cases. This is in contrast to the related art in which a bounding design margin is typically employed to cover all anticipated uncertainties and biases during the fuel cycle.

For a set of trials in which the one or more design limits are satisfied with no residual margin(s), the most robust design may achieve, for example, maximum energy gain at the highest confidence level.

Example embodiments may be used to determine the maximum energy gain over a fuel cycle. In FIG. 10, the maximum energy gain would be 600 MWd/st. In addition or in the alternative, example embodiments may be used to determine the highest confidence level of a given energy gain over the fuel cycle. In FIG. 10, the highest confidence level of a 75 MWd/st energy gain over the fuel cycle would be approximately 95% (94/99). In addition or in the alternative, example embodiments may be used to determine the highest energy gain at a given confidence level over the fuel cycle. In FIG. 10, the highest energy gain at a 38% confidence level (38/99) over the fuel cycle would be approximately 400 MWd/st.

In addition or in the alternative, the example embodiments may also be used to reduce fuel loading through reliance on the spectral shift. In FIG. 10, for example, the fuel enrichment of the fuel bundles could be reduced by an equivalent of about 75 MWd/st with a confidence level of approximately 95%. In addition or in the alternative, for example, fewer fresh fuel bundles could be loaded for the fuel cycle. Given that fuel bundles with a typical $U^{235}$ enrichment of about 5% cost $300,000, such reductions in fuel enrichment and/or loading could potentially save millions of dollars per fuel cycle.

Figure 11:
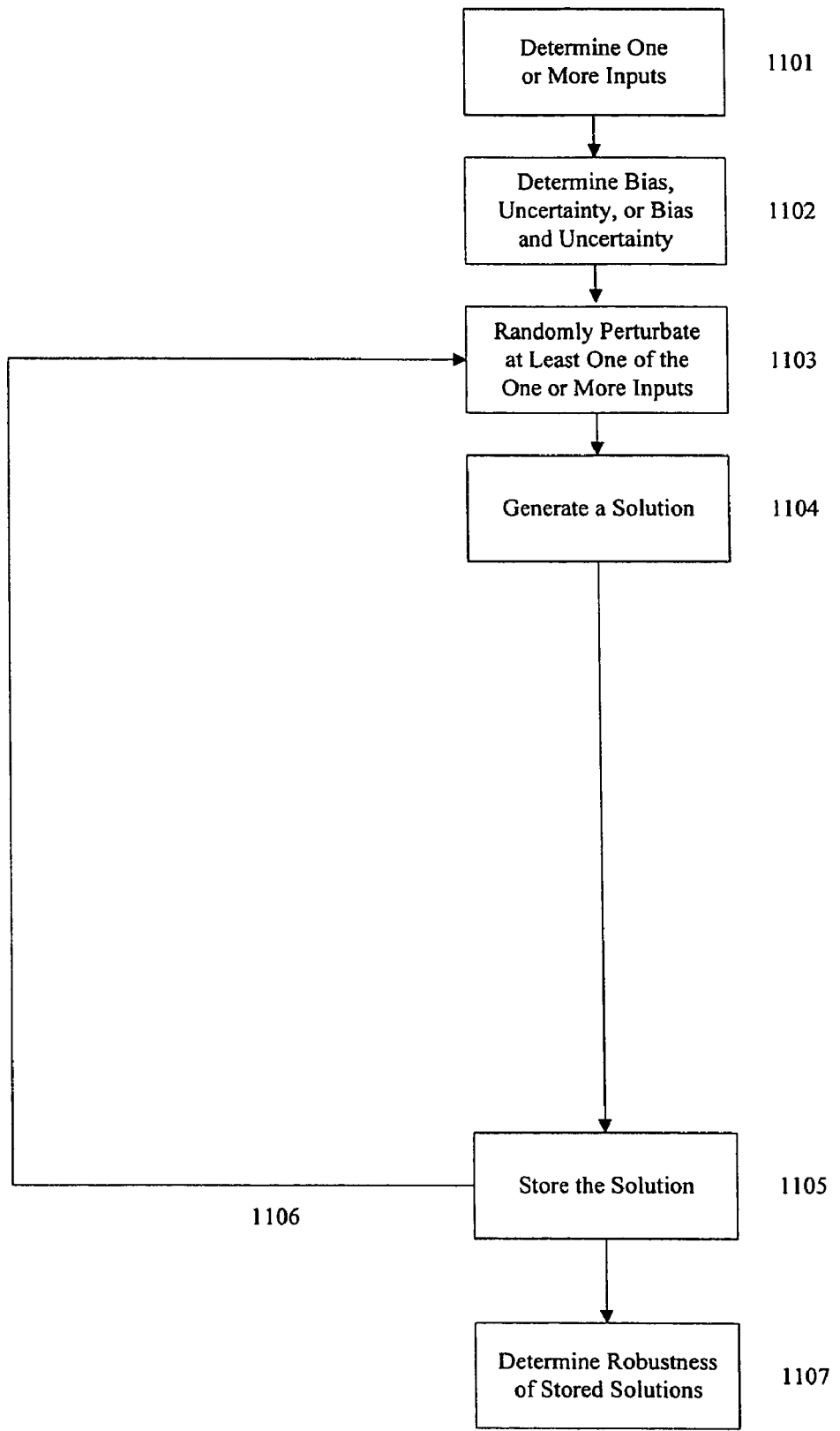
FIG. 11 is a flowchart illustrating a method for evaluating robustness of solutions to a constraint problem according to an example embodiment.

FIG. 11 is a flowchart illustrating a method for evaluating robustness of solutions to a constraint problem according to an example embodiment. In the example embodiment of FIG. 11, a method for evaluating robustness of solutions to a constraint problem may include: determining one or more inputs for the constraint problem 1101; determining bias, uncertainty, or bias and uncertainty of the one or more inputs 1102; randomly perturbating at least one of the one or more inputs based on the bias, uncertainty, or bias and uncertainty of the one or more inputs to determine one or more modified inputs 1103; generating a solution to the constraint problem based on the one or more modified inputs 1104; storing the solution 1105; repeating 1103 through 1105 until multiple solutions are stored 1106; and determining the robustness of the stored multiple solutions by comparison of the stored multiple solutions to each other 1107. The one or more modified inputs may include the randomly perturbated input or inputs and/or the non-perturbated input or inputs.

For a nuclear reactor, the determining one or more inputs for the constraint problem 1101 may include, for example, determining the independent control-variables, dependent variables, thermal limits, and/or reactivity limits. It may also include, for example, selecting a related art reactor design with traditional reactivity and thermal design margins as a "center point" data case.

For the nuclear reactor, the determining bias, uncertainty, or bias and uncertainty of the one or more inputs 1102 may include determining the bias, uncertainty, or bias and uncertainty of one or more of the independent control-variables, dependent variables, thermal limits, and/or reactivity limits.

The randomly perturbating at least one of the one or more inputs based on the bias, uncertainty, or bias and uncertainty of the one or more inputs to determine one or more modified inputs 1103 may include randomly perturbating at least one of the independent control-variables based on the bias, uncertainty, or bias and uncertainty of the respective independent control-variable(s). The random perturbation(s) may be calculated and/or applied using, for example, historical bias, uncertainty, or bias and uncertainty or statistical bias, uncertainty, or bias and uncertainty. As discussed above, the use of statistical bias, uncertainty, or bias and uncertainty may ease such calculations and/or applications.

The generating a solution to the constraint problem based on the one or more modified inputs 1104 may include executing software for the simulation of nuclear reactor core operations. Most any conventional reactor core simulation program (or suite of programs), such as for example, General Electric's ("GE's") "PANACEA" 3D reactor core simulation program, may be used in conjunction with the example embodiment. This type of simulator program is capable of three-dimensional processing of independent control-variables, dependent variables, thermal limits, and/or reactivity limits. An input file containing values for independent control-variables, thermal limits, and/or reactivity limits may be provided as an input and the simulator program may provide an output file including values for selected independent control-variables, dependent variables, thermal limits, and/or reactivity limits. The output file may include, for example, data typically used to gauge reactor core performance over a fuel cycle, such as HOTX, MFLPD, MAPRAT, MFLCPR, LHGR, MAPLHGR, CPR, Minimum CPR ("MCPR"), MFLCPR, etc.

Many of these types of data are both spatially dependent and time dependent, such as, for example, MFLPD, MAPLHGR, and MCPR. Accordingly, some of this data may be indicative of the state of the reactor core at a plurality of discrete intervals (i.e., each and every "exposure step") throughout one or more fuel cycles.

The storing the solution 1105 may include storing the output file in a one-dimensional, two-dimensional, or multi-dimensional array within a digital storage memory of a computer. The stored solution may represent the operational strategy for a given trial.

The repeating 1103 through 1105 until multiple solutions are stored 1106 may include conducting multiple trials while randomly perturbating at least one of the one or more inputs based on the bias, uncertainty, or bias and uncertainty of the one or more inputs to determine one or more modified inputs 1103.

The determining the robustness of the stored multiple solutions by comparison of the stored multiple solutions to each other 1107 may include manual comparison, automated comparison, or manual and automated comparison (i.e., visual analysis of the solutions on a computer display). The multiple solutions may provide a statistical distribution of one or more reactor characteristics. For example, the multiple solutions may provide a statistical distribution of cycle energy, from which energy gain can be determined. In this case, the most robust design may achieve, for example, maximum energy gain at the highest confidence level. In addition or in the alternative, the most robust design may achieve, for example, maximum energy gain with minimum sensitivity to deviations between predicted and measured values of the one or more inputs and/or the random perturbations.

The flowchart of FIG. 11 does not include determining whether some or all of the solutions satisfies the constraint problem. As a result, the determining the robustness of the stored multiple solutions by comparison of the stored multiple solutions to each other 1107 may include such a determination.

For the constraint problem of FIG. 11, the bias of a given input may include a mean value of the given input. Similarly, for the constraint problem of FIG. 11, the uncertainty of a given input may include a standard deviation of the given input.

The constraint problem may include core design for a nuclear reactor, operational strategy for the nuclear reactor, or core design and operational strategy for the nuclear reactor. The operational strategy may include, for example, core-flow strategy, control blade programming strategy, or core-flow strategy and control blade programming strategy. The control blade programming strategy may include, for example, control blade axial-position strategy, control blade sequence-exchange strategy, or control blade axial-position strategy and control blade sequence-exchange strategy.

The generating a solution to the constraint problem based on the one or more modified inputs 1104 may include simulating the operational strategy over at least a portion of a fuel cycle of the nuclear reactor. In other words, the stored multiple solutions may include multiple solutions for a given cycle exposure. In addition or in the alternative, the multiple solutions may include solutions for multiple values of cycle exposure.

Figure 12:
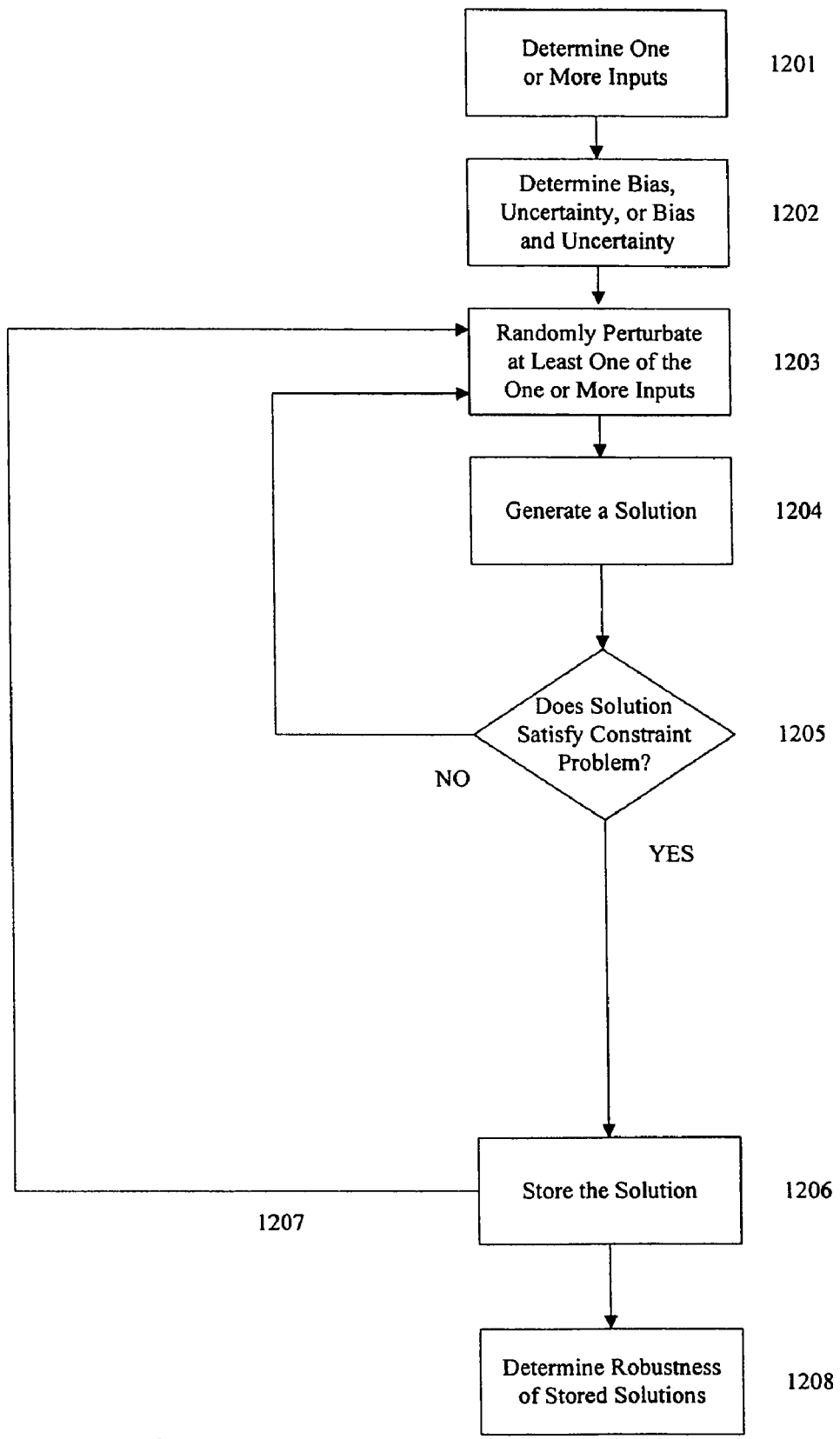
FIG. 12 is a flowchart illustrating a method for evaluating robustness of solutions to a constraint problem according to another example embodiment.

FIG. 12 is a flowchart illustrating a method for evaluating robustness of solutions to a constraint problem according to another example embodiment. In the expel embodiment of FIG. 12, a method for evaluating robustness of solutions to a constraint problem may include: determining one or more inputs for the constraint problem 1201; determining bias, uncertainty, or bias and uncertainty of the one or more inputs 1202; randomly perturbating at least one of the one or more inputs based on the bias, uncertainty, or bias and uncertainty of the one or more inputs to determine one or more modified inputs 1203; generating a solution to the constraint problem based on the one or more modified inputs 1204; determining whether the solution satisfies the constraint problem 1205; storing the solution, if the solution satisfies the constraint problem 1206; repeating 1203 through 1206 until multiple solutions that satisfy the constraint problem are stored 1207; and determining the robustness of the stored multiple solutions by comparison of the stored multiple solutions to each other 1208. The one or more modified inputs may include the randomly perturbated input or inputs and/or the non-perturbated input or inputs.

For a nuclear reactor, the determining one or more inputs for the constraint problem 1201 may include similar considerations as the determining one or more inputs for the constraint problem 1101; the determining bias, uncertainty, or bias and uncertainty of the one or more inputs 1202 may include similar considerations as the determining bias, uncertainty, or bias and uncertainty of the one or more inputs 1102; the randomly perturbating at least one of the one or more inputs based on the bias, uncertainty, or bias and uncertainty of the one or more inputs to determine one or more modified inputs 1203 may include similar considerations as the randomly perturbating at least one of the one or more inputs based on the bias, uncertainty, or bias and uncertainty of the one or more inputs to determine one or more modified inputs 1103; and the generating a solution to the constraint problem based on the one or more modified inputs 1204 may include similar considerations as the generating a solution to the constraint problem based on the one or more modified inputs 1104.

The determining whether the solution satisfies the constraint problem 1205 may include determining whether the solution exceeds one or more reactivity limits, one or more thermal limits, or one or more reactivity limits and one or more thermal limits for the nuclear reactor. If the solution does not satisfy the constraint problem, the solution may not be stored and the method may return to randomly perturbating at least one of the one or more inputs based on the bias, uncertainty, or bias and uncertainty of the one or more inputs to determine one or more modified inputs 1203. If the solution does satisfy the constraint problem, the method proceeds to storing the solution.

For the nuclear reactor, the storing the solution, if the solution satisfies the constraint problem 1206 may include similar considerations as the storing the solution 1105, with the additional knowledge that the solution satisfies the constraint problem; repeating 1203 through 1206 until multiple solutions that satisfy the constraint problem are stored 1207 may include similar considerations as repeating 1103 through 1105 until multiple solutions are stored 1106; and determining the robustness of the stored multiple solutions by comparison of the stored multiple solutions to each other 1208 may include similar considerations as determining the robustness of the stored multiple solutions by comparison of the stored multiple solutions to each other 1107, with the additional knowledge that the solution already satisfies the constraint problem.

For the constraint problem of FIG. 12, the bias of a given input may include a mean value of the given input. Similarly, for the constraint problem of FIG. 12, the uncertainty of a given input may include a standard deviation of the given input.

The constraint problem may include core design for a nuclear reactor, operational strategy for the nuclear reactor, or core design and operational strategy for the nuclear reactor. The operational strategy may include, for example, core-flow strategy, control blade programming strategy, or core-flow strategy and control blade programming strategy. The control blade programming strategy may include, for example, control blade axial-position strategy, control blade sequence-exchange strategy, or control blade axial-position strategy and control blade sequence-exchange strategy.

The generating a solution to the constraint problem based on the one or more modified inputs 1204 may include simulating the operational strategy over at least a portion of a fuel cycle of the nuclear reactor. In other words, the stored multiple solutions may include multiple solutions for a given cycle exposure. In addition or in the alternative, the multiple solutions may include solutions for multiple values of cycle exposure.

Figure 13:
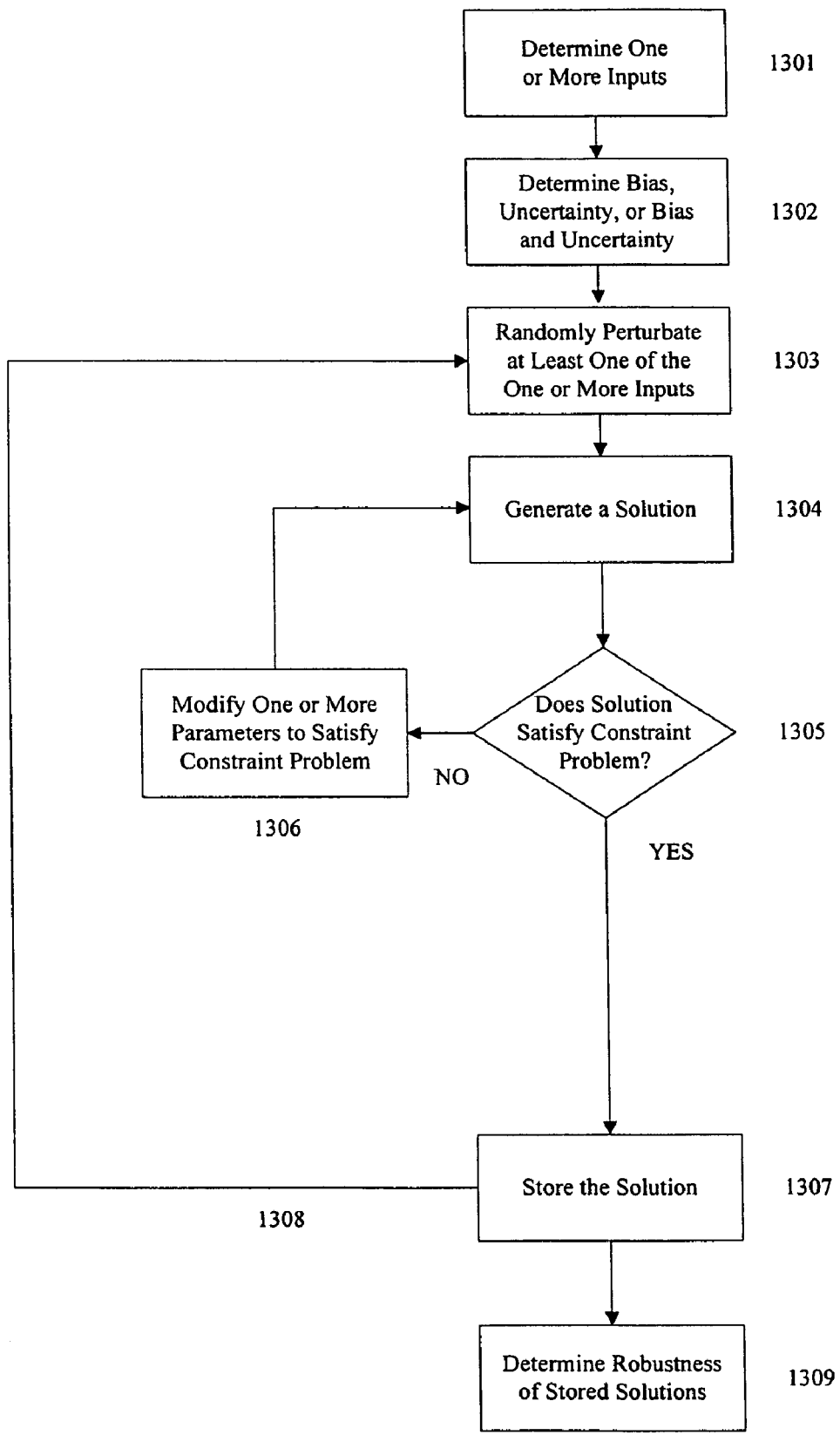
FIG. 13 is a flowchart illustrating a method for evaluating robustness of solutions to a constraint problem according to yet another example embodiment.

FIG. 13 is a flowchart illustrating a method for evaluating robustness of solutions to a constraint problem according to yet another example embodiment. In the example embodiment of FIG. 13, a method for evaluating robustness of solutions to a constraint problem may include: determining one or more inputs for the constraint problem 1301; determining bias, uncertainty, or bias and uncertainty of the one or more inputs 1302; randomly perturbating at least one of the one or more inputs based on the bias, uncertainty, or bias and uncertainty of the one or more inputs to determine one or more modified inputs 1303; generating a solution to the constraint problem based on the one or more modified inputs 1304; determining whether the solution satisfies the constraint problem 1305; modifying one or more parameters and repeating 1304 and 1305, if the solution does not satisfy the constraint problem 1306; storing the solution, if the solution satisfies the constraint problem 1307; repeating 1303 through 1307 until multiple solutions that satisfy the constraint problem are stored 1308; and determining the robustness of the stored multiple solutions by comparison of the stored multiple solutions to each other 1309. The one or more modified inputs may include the randomly perturbated input or inputs and/or the non-perturbated input or inputs.

For a nuclear reactor, the determining one or more inputs for the constraint problem 1301 may include similar considerations as the determining one or more inputs for the constraint problem 1101; the determining bias, uncertainty, or bias and uncertainty of the one or more inputs 1302 may include similar considerations as the determining bias, uncertainty, or bias and uncertainty of the one or more inputs 1102; the randomly perturbating at least one of the one or more inputs based on the bias, uncertainty, or bias and uncertainty of the one or more inputs to determine one or more modified inputs 1303 may include similar considerations as the randomly perturbating at least one of the one or more inputs based on the bias, uncertainty, or bias and uncertainty of the one or more inputs to determine one or more modified inputs 1103; and the generating a solution to the constraint problem based on the one or more modified inputs 1304 may include similar considerations as the generating a solution to the constraint problem based on the one or more modified inputs 1104.

The determining whether the solution satisfies the constraint problem 1305 may include determining whether the solution exceeds one or more reactivity limits, one or more thermal limits, or one or more reactivity limits and one or more thermal limits for the nuclear reactor. If the solution does not satisfy the constraint problem, the solution may not be stored, one or more parameters may be modified to satisfy the constraint problem and 1304 and 1305 may be repeated, and the method may return to generating a solution to the constraint problem based on the one or more modified inputs 1304. The one or more parameters may include at least one of core flow; axial position of a control blade, axial positions of the control blade, axial position of control blades, or axial positions of the control blades; and control blade sequence exchange. The one or more parameters may be changed, for example, based on a manual process (i.e., trial and error) or by optimization software (as discussed, for example, in U.S. Pat. No. 6,748,348—entitled "Design Method for Nuclear Reactor Fuel Management" and U.S. patent application Ser. No. 10/677,239—entitled "Method for Predicted Reactor Simulation". If the solution does satisfy the constraint problem, the method proceeds to storing the solution.

For the nuclear reactor, the storing the solution, if the solution satisfies the constraint problem 1307 may include similar considerations as the storing the solution 1105, with the additional knowledge that the solution satisfies the constraint problem; repeating 1303 through 1307 until multiple solutions that satisfy the constraint problem are stored 1308 may include similar considerations as repeating 1103 through 1105 until multiple solutions are stored 1106; and determining the robustness of the stored multiple solutions by comparison of the stored multiple solutions to each other 1309 may include similar considerations as determining the robustness of the stored multiple solutions by comparison of the stored multiple solutions to each other 1107, with the additional knowledge that the solution already satisfies the constraint problem.

For the constraint problem of FIG. 13, the bias of a given input may include a mean value of the given input. Similarly, for the constraint problem of FIG. 13, the uncertainty of a given input may include a standard deviation of the given input.

The constraint problem may include core design for a nuclear reactor, operational strategy for the nuclear reactor, or core design and operational strategy for the nuclear reactor. The operational strategy may include, for example, core-flow strategy, control blade programming strategy, or core-flow strategy and control blade programming strategy. The control blade programming strategy may include, for example, control blade axial-position strategy, control blade sequence-exchange strategy, or control blade axial-position strategy and control blade sequence-exchange strategy.

The generating a solution to the constraint problem based on the one or more modified inputs 1304 may include simulating the operational strategy over at least a portion of a fuel cycle of the nuclear reactor. In other words, the stored multiple solutions may include multiple solutions for a given cycle exposure. In addition or in the alternative, the multiple solutions may include solutions for multiple values of cycle exposure.

Figure 14:
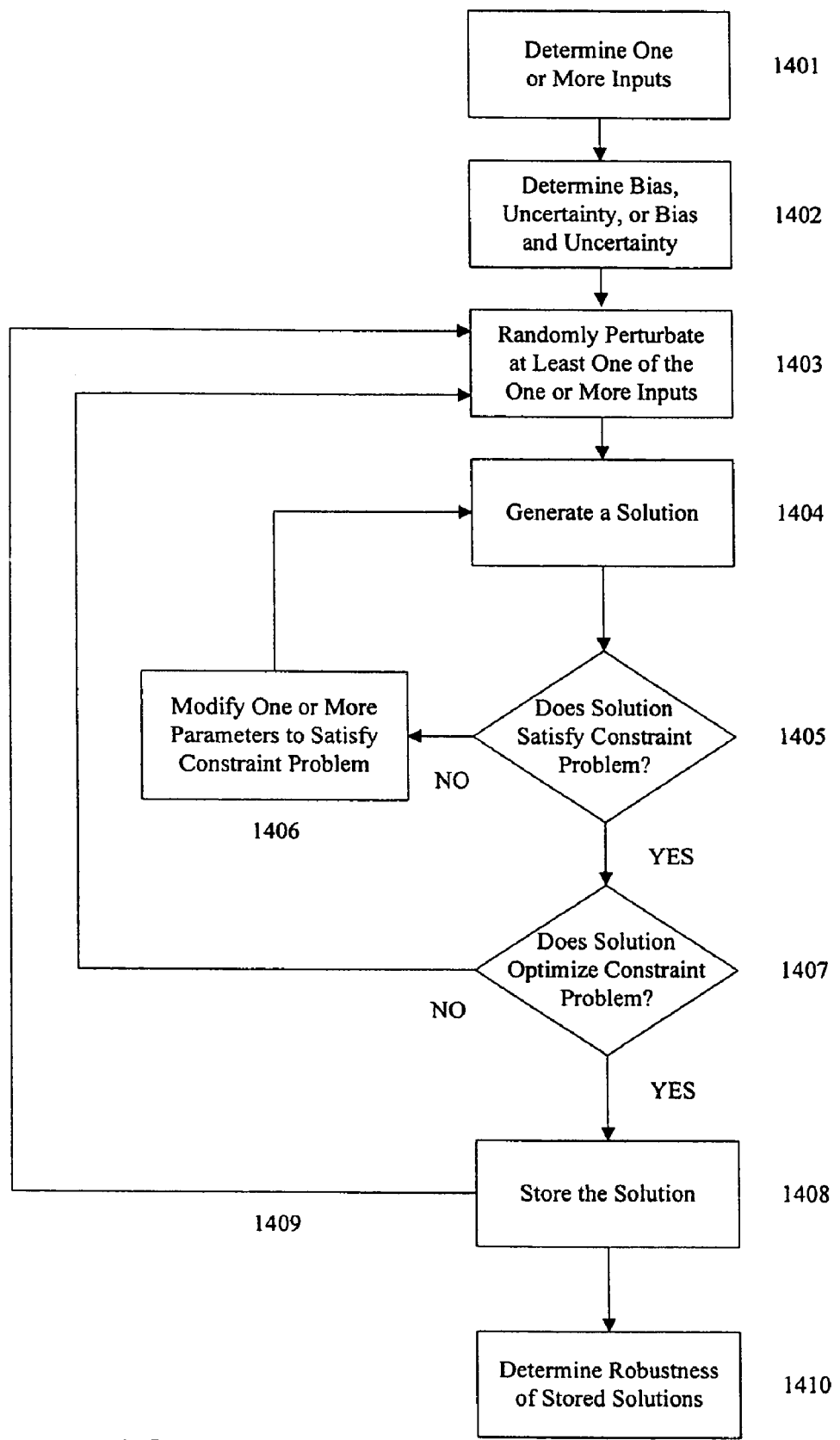
FIG. 14 is a flowchart illustrating a method for evaluating robustness of solutions to a constraint problem according to a further example embodiment.

FIG. 14 is a flowchart illustrating a method for evaluating robustness of solutions to a constraint problem according to a further example embodiment. In the embodiment of FIG. 14, a method for evaluating robustness of solutions to a constraint problem may include: determining one or more inputs for the constraint problem 1401; determining bias, uncertainty, or bias and uncertainty of the one or more inputs 1402; randomly perturbating at least one of the one or more inputs based on the bias, uncertainty, or bias and uncertainty of the one or more inputs to determine one or more modified inputs 1403; generating a solution to the constraint problem based on the one or more modified inputs 1404; determining whether the solution satisfies the constraint problem 1405; modifying one or more parameters and repeating 1404 and 1405, if the solution does not satisfy the constraint problem 1406; determining whether the solution optimizes the constraint problem, if the solution satisfies the constraint problem 1407; storing the solution, if the solution satisfies and optimizes the constraint problem 1408; repeating 1403 through 1408 until multiple solutions that satisfy and optimize the constraint problem are stored 1409; and/or determining the robustness of the stored multiple solutions by comparison of the stored multiple solutions to each other 1410. The one or more modified inputs may include the randomly perturbated input or inputs and/or the non-perturbated input or inputs.

For a nuclear reactor, the determining one or more inputs for the constraint problem 1401 may include similar considerations as the determining one or more inputs for the constraint problem 1101; the determining bias, uncertainty, or bias and uncertainty of the one or more inputs 1402 may include similar considerations as the determining bias, uncertainty, or bias and uncertainty of the one or more inputs 1102; the randomly perturbating at least one of the one or more inputs based on the bias, uncertainty, or bias and uncertainty of the one or more inputs to determine one or more modified inputs 1403 may include similar considerations as the randomly perturbating at least one of the one or more inputs based on the bias, uncertainty, or bias and uncertainty of the one or more inputs to determine one or more modified inputs 1103; and the generating a solution to the constraint problem based on the one or more modified inputs 1404 may include similar considerations as the generating a solution to the constraint problem based on the one or more modified inputs 1104.

The determining whether the solution satisfies the constraint problem 1405 may include determining whether the solution exceeds one or more reactivity limits, one or more thermal limits, or one or more reactivity limits and one or more thermal limits for the nuclear reactor. If the solution does not satisfy the constraint problem, the solution may not be stored, one or more parameters may be modified to satisfy the constraint problem and 1404 and 1405 may be repeated, and the method may return to generating a solution to the constraint problem based on the one or more modified inputs 1404. The one or more parameters may include at least one of core flow; axial position of a control blade, axial positions of the control blade, axial position of control blades, or axial positions of the control blades; and control blade sequence exchange. If the solution does satisfy the constraint problem, the method proceeds to determining whether the solution optimizes the constraint problem.

The determining whether the solution optimizes the constraint problem, if the solution satisfies the constraint problem 1407, may include determining whether a margin or margins exist between the solution and one or more reactivity limits, one or more thermal limits, or one or more reactivity limits and one or more thermal limits for the nuclear reactor. If the solution does not optimize the constraint problem, the solution may not be stored and the method may return to randomly perturbating at least one of the one or more inputs based on the bias, uncertainty, or bias and uncertainty of the one or more inputs to determine one or more modified inputs 1403. If the solution does optimize the constraint problem, the method proceeds to storing the solution.

For the nuclear reactor, the storing the solution, if the solution satisfies and optimizes the constraint problem 1408, may include similar considerations as the storing the solution 1105, with the additional knowledge that the solution satisfies and optimizes the constraint problem; repeating 1403 through 1408 until multiple solutions that satisfy the constraint problem are stored 1409 may include similar considerations as repeating 1103 through 1105 until multiple solutions are stored 1106; and determining the robustness of the stored multiple solutions by comparison of the stored multiple solutions to each other 1410 may include similar considerations as determining the robustness of the stored multiple solutions by comparison of the stored multiple solutions to each other 1107, with the additional knowledge that the solution already satisfies and optimizes the constraint problem.

For the constraint problem of FIG. 14, the bias of a given input may include a mean value of the given input. Similarly, for the constraint problem of FIG. 14, the uncertainty of a given input may include a standard deviation of the given input.

The constraint problem may include core design for a nuclear reactor, operational strategy for the nuclear reactor, or core design and operational strategy for the nuclear reactor. The operational strategy may include, for example, core-flow strategy, control blade programming strategy, or core-flow strategy and control blade programming strategy. The control blade programming strategy may include, for example, control blade axial-position strategy, control blade sequence-exchange strategy, or control blade axial-position strategy and control blade sequence-exchange strategy.

The generating a solution to the constraint problem based on the one or more modified inputs 1404 may include simulating the operational strategy over at least a portion of a fuel cycle of the nuclear reactor. In other words, the stored multiple solutions may include multiple solutions for a given cycle exposure. In addition or in the alternative, the multiple solutions may include solutions for multiple values of cycle exposure.

Figure 15:
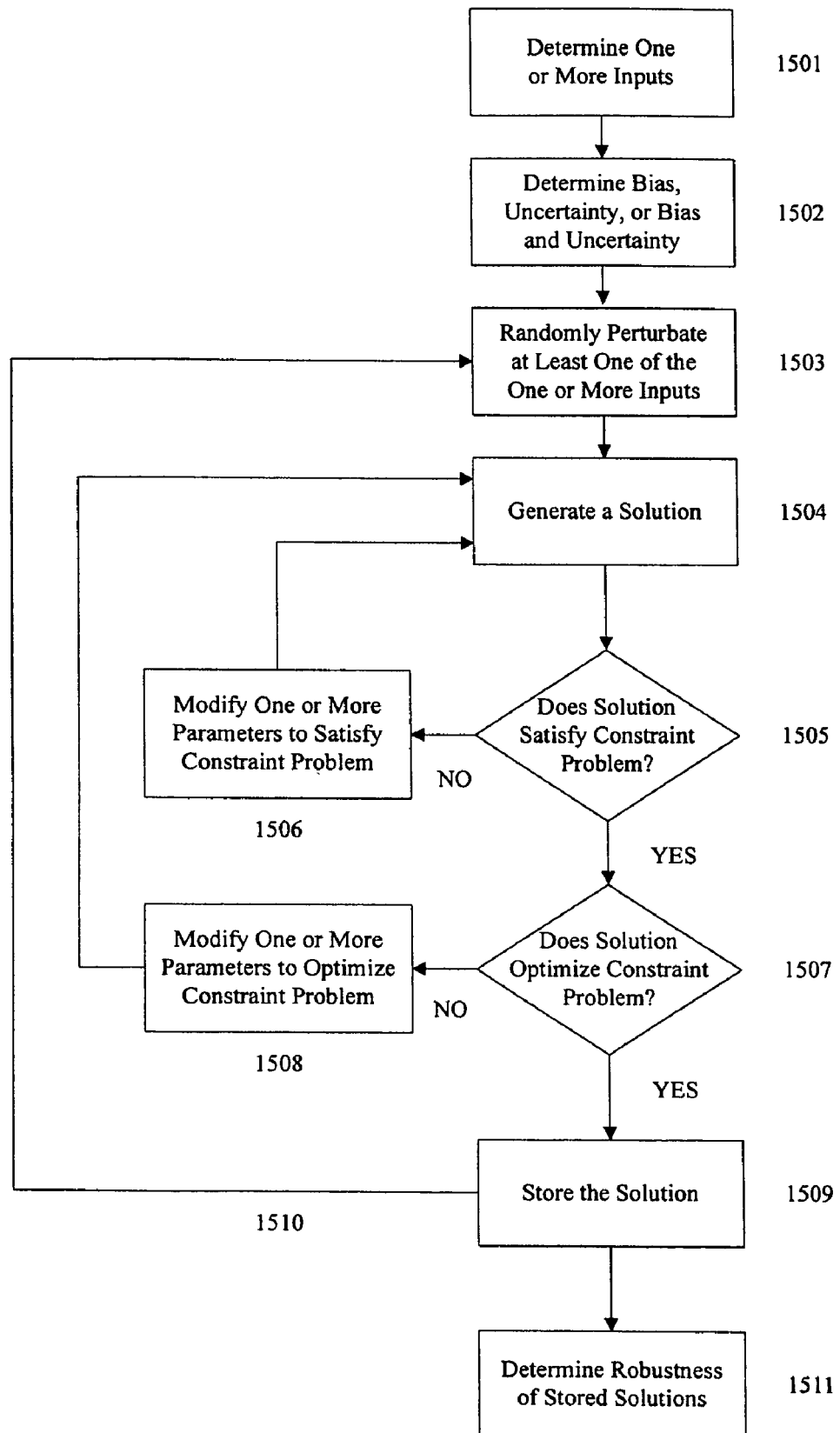
FIG. 15 is a flowchart illustrating a method for evaluating robustness of solutions to a constraint problem according to yet a further example embodiment.

FIG. 15 is a flowchart illustrating a method for evaluating robustness of solutions to a constraint problem according to yet a further example embodiment. In the embodiment of FIG. 15, a method for evaluating robustness of solutions to a constraint problem may include: determining one or more inputs for the constraint problem 1501; determining bias, uncertainty, or bias and uncertainty of the one or more inputs 1502; randomly perturbating at least one of the one or more inputs based on the bias, uncertainty, or bias and uncertainty of the one or more inputs to determine one or more modified inputs 1503; generating a solution to the constraint problem based on the one or more modified inputs 1504; determining whether the solution satisfies the constraint problem 1505; modifying one or more parameters and repeating 1504 and 1505, if the solution does not satisfy the constraint problem 1506; determining whether the solution optimizes the constraint problem, if the solution satisfies the constraint problem 1507; modifying the one or more parameters and repeating 1504 through 1507, if the solution does not optimize the constraint problem 1508; storing the solution, if the solution satisfies and optimizes the constraint problem 1509; repeating 1503 through 1509 until multiple solutions that satisfy and optimize the constraint problem are stored 1510; and determining the robustness of the stored multiple solutions by comparison of the stored multiple solutions to each other 1511. The one or more modified inputs may include the randomly perturbated input or inputs and/or the non-perturbated input or inputs.

For a nuclear reactor, the determining one or more inputs for the constraint problem 1501 may include similar considerations as the determining one or more inputs for the constraint problem 1101; the determining bias, uncertainty, or bias and uncertainty of the one or more inputs 1502 may include similar considerations as the determining bias, uncertainty, or bias and uncertainty of the one or more inputs 1102; the randomly perturbating at least one of the one or more inputs based on the bias, uncertainty, or bias and uncertainty of the one or more inputs to determine one or more modified inputs 1503 may include similar considerations as the randomly perturbating at least one of the one or more inputs based on the bias, uncertainty, or bias and uncertainty of the one or more inputs to determine one or more modified inputs 1103; and the generating a solution to the constraint problem based on the one or more modified inputs 1504 may include similar considerations as the generating a solution to the constraint problem based on the one or more modified inputs 1104.

The determining whether the solution satisfies the constraint problem 1505 may include determining whether the solution exceeds one or more reactivity limits, one or more thermal limits, or one or more reactivity limits and one or more thermal limits for the nuclear reactor. If the solution does not satisfy the constraint problem, the solution may not be stored, one or more parameters may be modified to satisfy the constraint problem and 1504 and 1505 may be repeated, and the method may return to generating a solution to the constraint problem based on the one or more modified inputs 1504. The one or more parameters may include at least one of core flow; axial position of a control blade, axial positions of the control blade, axial position of control blades, or axial positions of the control blades; and control blade sequence exchange. If the solution does satisfy the constraint problem, the method proceeds to determining whether the solution optimizes the constraint problem.

The determining whether the solution optimizes the constraint problem, if the solution satisfies the constraint problem 1507, may include determining whether a margin or margins exist between the solution and one or more reactivity limits, one or more thermal limits, or one or more reactivity limits and one or more thermal limits for the nuclear reactor. If the solution does not optimize the constraint problem, the solution may not be stored, one or more parameters may be modified to optimize the constraint problem and 1504 through 1507 may be repeated, and the method may return to generating a solution to the constraint problem based on the one or more modified inputs 1504. If the solution does optimize the constraint problem, the method proceeds to storing the solution.

For the nuclear reactor, the storing the solution, if the solution satisfies and optimizes the constraint problem 1509, may include similar considerations as the storing the solution 1105, with the additional knowledge that the solution satisfies and optimizes the constraint problem; repeating 1503 through 1509 until multiple solutions that satisfy the constraint problem are stored 1410 may include similar considerations as repeating 1103 through 1105 until multiple solutions are stored 1106; and determining the robustness of the stored multiple solutions by comparison of the stored multiple solutions to each other 151 may include similar considerations as determining the robustness of the stored multiple solutions by comparison of the stored multiple solutions to each other 1107, with the additional knowledge that the solution already satisfies and optimizes the constraint problem.

For the constraint problem of FIG. 15, the bias of a given input may include a mean value of the given input. Similarly, for the constraint problem of FIG. 15, the uncertainty of a given input may include a standard deviation of the given input.

The constraint problem may include core design for a nuclear reactor, operational strategy for the nuclear reactor, or core design and operational strategy for the nuclear reactor. The operational strategy may include, for example, core-flow strategy, control blade programming strategy, or core-flow strategy and control blade programming strategy. The control blade programming strategy may include, for example, control blade axial-position strategy, control blade sequence-exchange strategy, or control blade axial-position strategy and control blade sequence-exchange strategy.

The generating a solution to the constraint problem based on the one or more modified inputs 1504 may include simulating the operational strategy over at least a portion of a fuel cycle of the nuclear reactor. In other words, the stored multiple solutions may include multiple solutions for a given cycle exposure. In addition or in the alternative, the multiple solutions may include solutions for multiple values of cycle exposure.

As will be appreciated, example embodiments of the methods for evaluating robustness of solutions to constraint problems may be generated solutions quickly, making this a feasible option for rapidly evaluating robustness of solutions to constraint problems.

As will be appreciated, core flow and control blade axial position are two example independent control-variables, and designing an operational strategy of a nuclear reactor may include other independent control-variables, other types of output-file data, and other statistical analysis. Furthermore, the nuclear reactor of the example embodiments has been used only for the purposes of providing an example constraint problem. It will be understood that the concepts of the present invention are applicable to any constraint problem. Therefore, the independent control-variables, the output-file data, and the statistical analysis performed will depend on the nature of the constraint problem to which the methods of the prevent invention would be applied. For example, feedwater temperature is a potential independent control-variable for the new Economic Simplified BWR ("ESBWR") design. As is known, the feedwater flow replaces the steam flow leaving the reactor (to spin the turbine) in a BWR and mixes with the "separated water" that is recirculated back through the core. As is also known, separators are basically pipes above the fuel that have vanes inside that spin the wet steam, sending the liquid outward and sending the dry steam onward. The liquid drops back down through the outside of the vessel and gets pumped downward so that it may re-enter through the bottom of the fuel. The feedwater flow, or make-up flow, comes in at a lower temperature so that the water entering the bottom of the fuel is below the saturation point (i.e., a bit away from producing steam). By changing the feedwater temperature, one can change how much sooner or later the water will begin to boil, impacting the nuclear feedback and power make within the reactor (voids provide negative feedback, tending to reduce reactivity much like a control blade; in contrast, lack of voids provides positive feedback).

While example embodiments have been particularly shown and described, it will be understood by those of ordinary skill in the art that various changes in form and details may be made in the example embodiments without departing from the spirit and scope of the present invention as defined by the following claims.

What is claimed is:

1. A method for evaluating robustness of solutions to a constraint problem, the method comprising:
 (a) determining one or more inputs for the constraint problem;
 (b) determining bias, uncertainty, or bias and uncertainty of the one or more inputs;
 (c) randomly perturbating at least one of the one or more inputs based on the bias, uncertainty, or bias and uncertainty of the one or more inputs to determine one or more modified inputs;
 (d) generating a solution to the constraint problem based on the one or more modified inputs;
 (e) storing the solution;
 (f) repeating (c) through (e) until multiple solutions are stored; and
 (g) determining the robustness of the stored multiple solutions by comparison of the stored multiple solutions to each other;
 wherein the one or more modified inputs comprise:
  the randomly perturbated input or inputs; and
  the non-perturbated input or inputs.

2. The method of claim 1, wherein the constraint problem comprises:
 core design for a nuclear reactor;
 operational strategy for the nuclear reactor; or
 core design and operational strategy for the nuclear reactor.

3. The method of claim 2, wherein the operational strategy comprises core-flow strategy.

4. The method of claim 2, wherein the operational strategy comprises control blade programming strategy.

5. The method of claim 4, wherein the control blade programming strategy comprises control blade axial-position strategy.

6. The method of claim 4, wherein the control blade programming strategy comprises control blade sequence-exchange strategy.

7. The method of claim 2, wherein the operational strategy comprises:
 core-flow strategy; and
 control blade programming strategy.

8. The method of claim 2, wherein the generating a solution to the constraint problem based on the one or more modified inputs comprises simulating the operational strategy over at least a portion of a fuel cycle of the nuclear reactor.

9. The method of claim 1, wherein the bias of a given input comprises a mean value of the given input.

10. The method of claim 1, wherein the uncertainty of a given input comprises a standard deviation of the given input.

11. A method for evaluating robustness of solutions to a constraint problem, the method comprising:
 (a) determining one or more inputs for the constraint problem;
 (b) determining bias, uncertainty, or bias and uncertainty of the one or more inputs;
 (c) randomly perturbating at least one of the one or more inputs based on the bias, uncertainty, or bias and uncertainty of the one or more inputs to determine one or more modified inputs;
 (d) generating a solution to the constraint problem based on the one or more modified inputs;
 (e) determining whether the solution satisfies the constraint problem;
 (f) storing the solution, if the solution satisfies the constraint problem;
 (g) repeating (c) through (f) until multiple solutions that satisfy the constraint problem are stored; and
 (h) determining the robustness of the stored multiple solutions by comparison of the stored multiple solutions to each other;
 wherein the one or more modified inputs comprise:
  the randomly perturbated input or inputs; and
  the non-perturbated input or inputs.

12. The method of claim 11, wherein the constraint problem comprises:
 core design for a nuclear reactor;
 operational strategy for the nuclear reactor; or
 core design and operational strategy for the nuclear reactor.

13. The method of claim 12, wherein the determining whether the solution satisfies the constraint problem comprises determining whether the solution exceeds one or more reactivity limits, one or more thermal limits, or one or more reactivity limits and one or more thermal limits for the nuclear reactor.

14. A method for evaluating robustness of solutions to a constraint problem, the method comprising:
   (a) determining one or more inputs for the constraint problem;
   (b) determining bias, uncertainty, or bias and uncertainty of the one or more inputs;
   (c) randomly perturbating at least one of the one or more inputs based on the bias, uncertainty, or bias and uncertainty of the one or more inputs to determine one or more modified inputs;
   (d) generating a solution to the constraint problem based on the one or more modified inputs;
   (e) determining whether the solution satisfies the constraint problem;
   (f) modifying one or more parameters and repeating (d) and (e), if the solution does not satisfy the constraint problem;
   (g) storing the solution, if the solution satisfies the constraint problem;
   (h) repeating (c) through (g) until multiple solutions that satisfy the constraint problem are stored; and
   (i) determining the robustness of the stored multiple solutions by comparison of the stored multiple solutions to each other;
   wherein the one or more modified inputs comprise:
      the randomly perturbated input or inputs; and
      the non-perturbated input or inputs.

15. The method of claim 14, wherein the constraint problem comprises:
   core design for a nuclear reactor;
   operational strategy for the nuclear reactor; or
   core design and operational strategy for the nuclear reactor.

16. The method of claim 15, wherein the one or more parameters comprise at least one of:
   core flow;
   axial position of a control blade, axial positions of the control blade, axial position of control blades, or axial positions of the control blades; and
   control blade sequence exchange.

17. A method for evaluating robustness of solutions to a constraint problem, the method comprising:
   (a) determining one or more inputs for the constraint problem;
   (b) determining bias, uncertainty, or bias and uncertainty of the one or more inputs;
   (c) randomly perturbating at least one of the one or more inputs based on the bias, uncertainty, or bias and uncertainty of the one or more inputs to determine one or more modified inputs;
   (d) generating a solution to the constraint problem based on the one or more modified inputs;
   (e) determining whether the solution satisfies the constraint problem;
   (f) modifying one or more parameters and repeating (d) and (e), if the solution does not satisfy the constraint problem;
   (g) determining whether the solution optimizes the constraint problem, if the solution satisfies the constraint problem;
   (h) storing the solution, if the solution satisfies and optimizes the constraint problem;
   (i) repeating (c) through (h) until multiple solutions that satisfy and optimize the constraint problem are stored; and
   (j) determining the robustness of the stored multiple solutions by comparison of the stored multiple solutions to each other;
   wherein the one or more modified inputs comprise:
      the randomly perturbated input or inputs; and
      the non-perturbated input or inputs.

18. The method of claim 17, wherein the constraint problem comprises:
   core design for a nuclear reactor;
   operational strategy for the nuclear reactor; or
   core design and operational strategy for the nuclear reactor.

19. The method of claim 18, wherein the determining whether the solution optimizes the constraint problem comprises determining whether a margin or margins exist between the solution and one or more reactivity limits, one or more thermal limits, or one or more reactivity limits and one or more thermal limits for the nuclear reactor.

20. A method for evaluating robustness of solutions to a constraint problem, the method comprising:
   (a) determining one or more inputs for the constraint problem;
   (b) determining bias, uncertainty, or bias and uncertainty of the one or more inputs;
   (c) randomly perturbating at least one of the one or more inputs based on the bias, uncertainty, or bias and uncertainty of the one or more inputs to determine one or more modified inputs;
   (d) generating a solution to the constraint problem based on the one or more modified inputs;
   (e) determining whether the solution satisfies the constraint problem;
   (f) modifying one or more parameters and repeating (d) and (e), if the solution does not satisfy the constraint problem;
   (g) determining whether the solution optimizes the constraint problem, if the solution satisfies the constraint problem;
   (h) modifying the one or more parameters and repeating (d) through (g), if the solution does not optimize the constraint problem;
   (i) storing the solution, if the solution satisfies and optimizes the constraint problem;
   (j) repeating (c) through (i) until multiple solutions that satisfy and optimize the constraint problem are stored; and
   (k) determining the robustness of the stored multiple solutions by comparison of the stored multiple solutions to each other;
   wherein the one or more modified inputs comprise:
      the randomly perturbated input or inputs; and
      the non-perturbated input or inputs.

* * * * *